US012269715B2

(12) United States Patent
Post et al.

(10) Patent No.: US 12,269,715 B2
(45) **Date of Patent: *Apr. 8, 2025**

(54) ZERO-GRAVITY HOIST CONTROL

(71) Applicant: MILWAUKEE ELECTRIC TOOL CORPORATION, Brookfield, WI (US)

(72) Inventors: Matthew Post, Milwaukee, WI (US); Isabel M. Lloyd, West Allis, WI (US); Gareth Mueckl, Milwaukee, WI (US); John S. Scott, Brookfield, WI (US); Matthew N. Thurin, Richfield, WI (US); Timothy J. Campbell, Brookfield, WI (US); Jonathan L. Lambert, Milwaukee, WI (US); James Wekwert, Whitefish Bay, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,797

(22) Filed: Nov. 20, 2023

(65) Prior Publication Data

US 2024/0083717 A1 Mar. 14, 2024

Related U.S. Application Data

(63) Continuation of application No. 17/155,797, filed on Jan. 22, 2021, now Pat. No. 11,851,306.

(Continued)

(51) Int. Cl.
*B66C 13/24* (2006.01)
*B66C 13/16* (2006.01)

(52) U.S. Cl.
CPC .............. *B66C 13/24* (2013.01); *B66C 13/16* (2013.01)

(58) Field of Classification Search
CPC ....... B66C 11/24; B66C 13/04; B66C 13/085; B66C 13/16; B66C 13/22; B66C 13/23;
(Continued)

(56) References Cited

U.S. PATENT DOCUMENTS 3,421,737 A 1/1969 Ulbing
3,758,079 A 9/1973 Workman, Jr. et al.
(Continued)

FOREIGN PATENT DOCUMENTS

CN 1270169 C 8/2006
CN 101476928 B 6/2010
(Continued)

OTHER PUBLICATIONS

Garage Smart,"Basic Lifter," <https://garagesmart.com/products/basic-lifter> web page publicly available at least as early as Jan. 15, 2020.

(Continued)

*Primary Examiner* — Emmanuel M Marcelo
(74) *Attorney, Agent, or Firm* — Michael Best & Friedrich LLP

(57) ABSTRACT

A zero-gravity hoist system including a chain fall, a motor coupled to the chain fall and configured to drive the chain fall in one or more directions, a power supply configured to provide power to the motor, and a controller having one or more electronic processors. The one or more electronic processors are configured to measure a first force of a load in response to receiving an input, store the measured first force in a memory of the controller, measure a second force of the load, determine a difference between the second measured force and the first measured force, and adjust a height of the load based on determining that the second force differs from the first force by a predetermined threshold.

20 Claims, 42 Drawing Sheets

Related U.S. Application Data

(60) Provisional application No. 63/092,715, filed on Oct. 16, 2020, provisional application No. 63/044,783, filed on Jun. 26, 2020, provisional application No. 63/009,635, filed on Apr. 14, 2020, provisional application No. 62/965,574, filed on Jan. 24, 2020.

(58) Field of Classification Search
CPC ........... B66C 13/44; B66C 13/46; B66D 1/46; B66D 3/18; B66D 2700/025
See application file for complete search history.

(56) References Cited

U.S. PATENT DOCUMENTS

| | | | |
|---|---|---|---|
| 5,863,027 | A | 1/1999 | Pattison |
| 5,865,426 | A | 2/1999 | Kazerooni |
| 6,073,496 | A | 6/2000 | Kuhn et al. |
| 6,241,462 | B1 | 6/2001 | Wannasuphoprasit et al. |
| 6,386,513 | B1 | 5/2002 | Kazerooni |
| 6,634,621 | B2 | 10/2003 | Keith |
| 6,916,015 | B2 | 7/2005 | Andreasson |
| 7,559,533 | B2 | 7/2009 | Stockmaster et al. |
| 8,271,229 | B2 | 9/2012 | Hsu et al. |
| 8,596,416 | B2 | 12/2013 | Crew et al. |
| 9,566,877 | B2 | 2/2017 | Kriger |
| 9,758,356 | B2 | 9/2017 | Särndahl |
| 9,950,908 | B2 | 4/2018 | Verheyen et al. |
| 10,017,078 | B2 | 7/2018 | Kriger |
| 10,245,973 | B2 | 4/2019 | Kriger |
| 10,525,849 | B2 | 1/2020 | Kriger |
| 11,851,306 | B2 * | 12/2023 | Post ......................... B66D 3/18 |
| 2002/0144970 | A1 | 10/2002 | Seith |
| 2003/0057408 | A1 | 3/2003 | Kazerooni et al. |
| 2005/0060246 | A1 | 3/2005 | Lastinger et al. |
| 2005/0179020 | A1 | 8/2005 | Taylor et al. |
| 2007/0050271 | A1 | 3/2007 | Ufford et al. |
| 2007/0068270 | A1 | 3/2007 | Coffey et al. |
| 2007/0138415 | A1 | 6/2007 | Rees |
| 2008/0087475 | A1 | 4/2008 | Petrucelli |
| 2018/0340818 | A1 | 11/2018 | Oliver |
| 2021/0087027 | A1 | 3/2021 | Kerovuori et al. |

FOREIGN PATENT DOCUMENTS

| | | | |
|---|---|---|---|
| CN | 207636164 | U | 7/2018 |
| DE | 102017126182 | A1 | 5/2019 |
| JP | H0569099 | U | 9/1993 |
| JP | 2004292111 | A | 10/2004 |
| KR | 100449991 | B1 | 9/2004 |
| KR | 1020050066577 | A | 6/2005 |
| KR | 101007246 | B1 | 1/2011 |
| SE | 200502012 | A | 9/2006 |
| WO | 2006098645 | A1 | 9/2006 |
| WO | 2013124839 | A1 | 8/2013 |

OTHER PUBLICATIONS

International Search Report and Written Opinion for Application No. PCT/US2021/014616 dated May 27, 2021 (13 pages).

* cited by examiner

ZERO-GRAVITY HOIST CONTROL

CROSS-REFERENCE TO RELATED APPLICATIONS

This application claims the benefit of, and priority to, U.S. patent application Ser. No. 17/155,797 (published as U.S. Patent Publication No. 2021/0229963) filed Jan. 22, 2021, and which claims the benefit of priority to U.S. Provisional Patent Application No. 62/965,574 filed Jan. 24, 2020; U.S. Provisional Patent Application No. 62/009,635, filed Apr. 14, 2020; U.S. Provisional Patent Application No. 63/044,783, filed Jun. 26, 2020; and U.S. Provisional Patent Application No. 63/092,715, filed Oct. 16, 2020, the entire contents of each are hereby incorporated by reference.

FIELD

This application relates to a hoist system and control of a hoist system.

BACKGROUND

The concepts described in this application relate to hoist systems. Hoist system are used by professionals in a variety of industries to lift and maneuver various loads, support work surfaces, support humans in varying work environments, etc. Control of hoist system, particularly when lifting or maneuvering large and/or heavy loads is usually done via one or more push button controllers which do not always allow precision control of the load being moved.

SUMMARY

Zero-gravity hoist systems described herein include a chain fall, a motor coupled to the chain fall and configured to drive the chain fall in one or more directions, a power supply configured to provide power to the motor, and a controller having one or more electronic processors. The one or more electronic processors are configured to measure a first force of a load in response to receiving an input, store the measured first force in a memory of the controller, measure a second force of the load, determine a difference between the second measured force and the first measured force, and adjust a height of the load based on determining that the second force differs from the first force by a predetermined threshold.

In some aspects, the one or more electronic processors are further configured to lower the height of the load based on determining that the second force is greater than the first force by at least the predetermined threshold.

In some aspects, the one or more electronic processors are further configured to raise the height of the load based on determining that the second force is less than the first force by at least the predetermined threshold.

In some aspects, the motor is a brushless direct current motor.

In some aspects, the power supply is a lithium-based battery pack.

In some aspects, the lithium-based battery pack is a power tool battery pack.

In some aspects, the zero-gravity hoist system further includes a load sensing assembly configured to determine the force of the load attached to the chain fall. The load sensing assembly is positioned between the chain fall and a support or the load. The load sensing assembly includes a spring plate configured to deflect in a first direction when the force of the load increases, and a first sensor configured to apply a first electrical signal to a first conductive surface associated with the spring plate. The first sensor includes a first antenna configured to receive a signal from the first conductive surface, wherein the first electrical signal is dependent on a distance between the first antenna and the first conductive surface. The load sensing assembly also includes a sensor circuit configured to receive an input from the first antenna representative of the distance between the first antenna and the first conductive surface. The load sensing assembly is configured to transmit the determined force to the controller.

Hoist systems described herein include a battery pack powered hoist device and a load sensing assembly. The load sensing assembly is configured to determine a force of a load attached to the hoist device. The load sensing assembly is positioned between the hoist device and a support or a load. The load sensing assembly includes a spring plate configured to deflect in a first direction when the load increases, a first sensor, and a sensor circuit. The first sensor is configured to apply a first electrical signal to a first conductive surface associated with the spring plate. The first sensor includes a first antenna configured to receive a signal from the first conductive surface. The first electrical signal is dependent on a distance between the first antenna and the first conductive surface. The sensor circuit is configured to receive an input from the first antenna representative of the distance between the first antenna and the first conductive surface.

In some aspects, the sensor circuit includes a tank circuit configured to detect a change in inductance in the first electrical signal from the first sensor.

In some aspects, the change in inductance is proportional to the distance between the first antenna and the first conductive surface.

In some aspects, the load sensing assembly further includes a second sensor configured to apply a second electrical signal to second conductive surface associated with the spring plate. The second sensor includes a second antenna configured to receive a second signal from the second conductive surface. The second electrical signal is dependent on a second distance between the second antenna and the second conductive surface.

In some aspects, the first sensor and the second sensor are located mechanically opposite of each other.

In some aspects, the first electrical signal and the second signal are provided to the sensor circuit as differential output signals.

In some aspects, the hoist system also includes a chain fall, a motor coupled to the chain fall, and configured to drive the chain fall in one or more directions, and a controller in communication with the load sensing assembly and having one or more electronic processors. The one or more electronic processors are configured to receive an input from a user indicating that the load coupled to the chain fall is at a desired height, receive a first force of the load from the load sensing assembly in response to receiving the input, and store the measured force in a memory of the controller. The processors are also configured to receive a second force of the load from the load sensing assembly, determine a difference between the second measured force and the first measured force, and adjust the height of the load based on determining that the second force differs from the first force by a predetermined threshold.

Zero-gravity hoist systems described herein include a hoist and a motor coupled to the hoist configured to drive the hoist in one or more directions. The zero-gravity hoist system also includes a load sensing assembly configured to determine a force of a load attached to the hoist. The load sensing assembly is positioned between the hoist and a support or the load, the load sensing assembly includes a spring plate configured to deflect in a first direction when the load increases, and a first sensor configured to apply a first electrical signal to a first conductive surface associated with the spring plate. The first sensor includes a first antenna configured to receive a signal from the first conductive surface. The first electrical signal is dependent on a distance between the first antenna and the first conductive surface. The load sensing assembly also includes a sensor circuit configured to receive an input from the first antenna representative of the distance between the first antenna and the first conductive surface. The zero-gravity hoist system also includes a power supply configured to provide power to the motor, and a controller having one or more electronic processors. The one or more electronic processors are configured to receive a first force of the load from the load sensing assembly in response to receiving an input, store the received first force in a memory of the controller, receive a second force of the load from the load sensing assembly, determine a difference between the second measured force and the first measured force, and adjust a height of the load based on determining that the second force differs from the first force by a predetermined threshold.

In some aspects, the one or more electronic processors are further configured to lower the height of the load based on determining that the second force is greater than the first force by at least the predetermined threshold.

In some aspects, the one or more electronic processors are further configured to raise the height of the load based on determining that the second force is less than the first force by at least the predetermined threshold.

In some aspects, the sensor circuit includes a tank circuit configured to detect a change in inductance in the first electrical signal from the first sensor.

In some aspects, the change in inductance is proportional to the distance between the first antenna and the first conductive surface.

In some aspects, the load sensing assembly further includes a second sensor configured to apply a second electrical signal to a second conductive surface associated with the spring plate. The second sensor includes a second antenna configured to receive a second signal from the second conductive surface, wherein the second electrical signal is dependent on a second distance between the second antenna and the second conductive surface.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein relate to various systems for controlling a hoist or lifting system to, among other things, achieve fine movements of a suspended load with minimal force by a user. The following examples of hoist control systems are not exhaustive, and alternative or modified methods and configurations are also contemplated.

Figure 1:
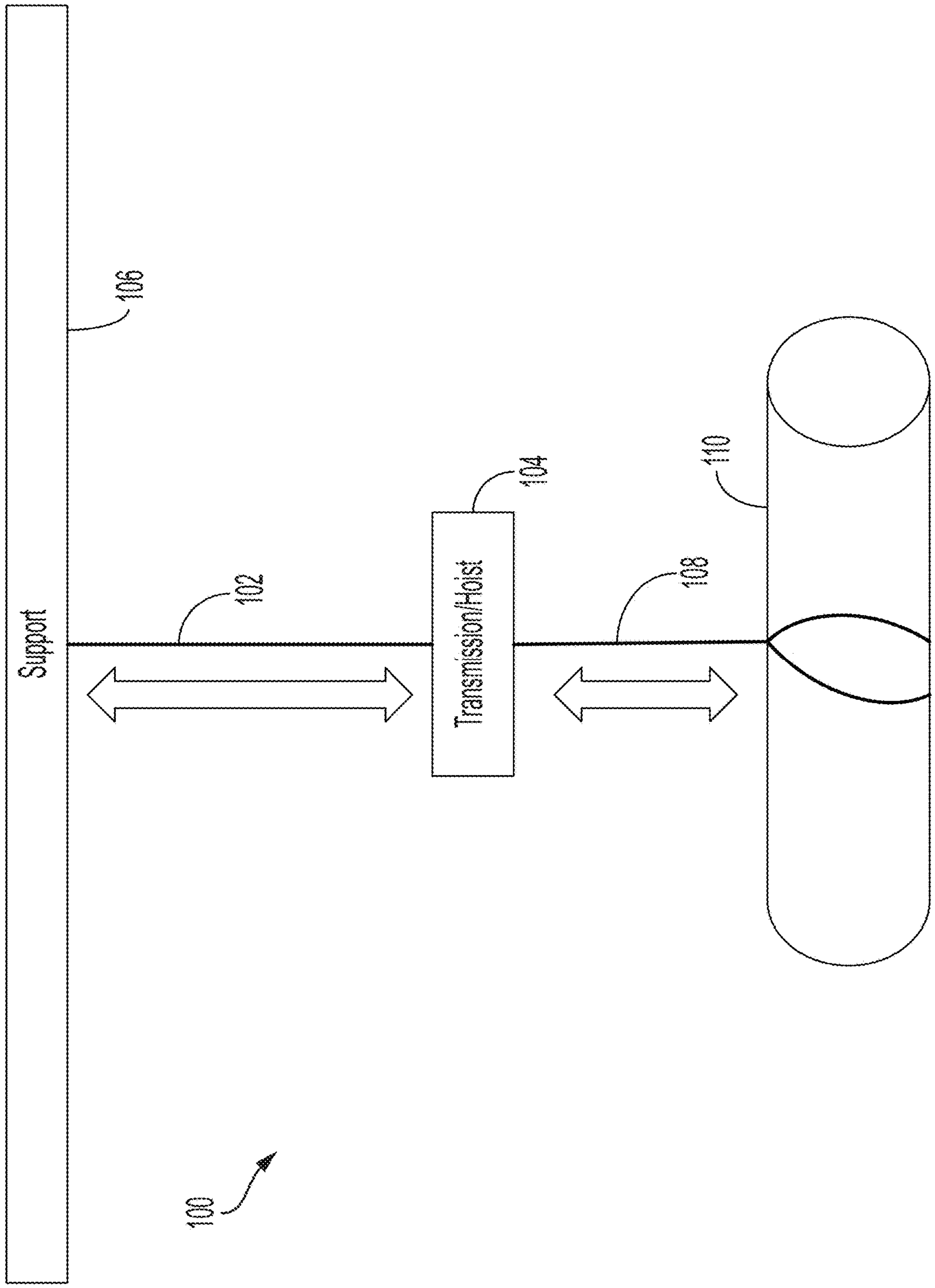
FIG. 1 illustrates an example of a hoist system, according to some embodiments.

FIG. 1 illustrates an example hoist system 100. The hoist system 100 has a main cable 102 connected between a hoist 104 and a support 106. The cable 102 may be constructed of different materials, such as wire cables, rope, chain, hybrid (e.g. rope covered wire cables), and the like. In some embodiments, the hoist 104 is configured to interface with the cable 102 to move the hoist in a longitudinal direction (i.e. up or down) along the cable 102. This can allow for more gross movements of the hoist 104 when needed. In still further embodiments, the hoist may be configured to move in a lateral direction along an axis of the support 106. However, in other embodiments, the hoist 104 is configured to simply be coupled to the cable 102 at a fixed distance, with no ability to change its position along the cable 102 without a user manually repositioning the hoist 104 on the cable 102.

The hoist 104 is further coupled to a load cable 108, which couples the hoist to a load 110. Similar to the cable 102, the load cable 108 may be a wire cable, a rope, a chain, a hybrid, and the like. The hoist 104 is configured to extend or retract the load cable 108 in order to move the load in a longitudinal direction (e.g. up or down). In some embodiments, the hoist 104 includes an electric motor to extend or retract the load cable 108. However, in other examples, mechanical winches or other mechanisms may be used. The hoist 104 may be controlled via a wired or wireless remote-control system operable by a user to control the operation of the hoist 104.

Figure 2:
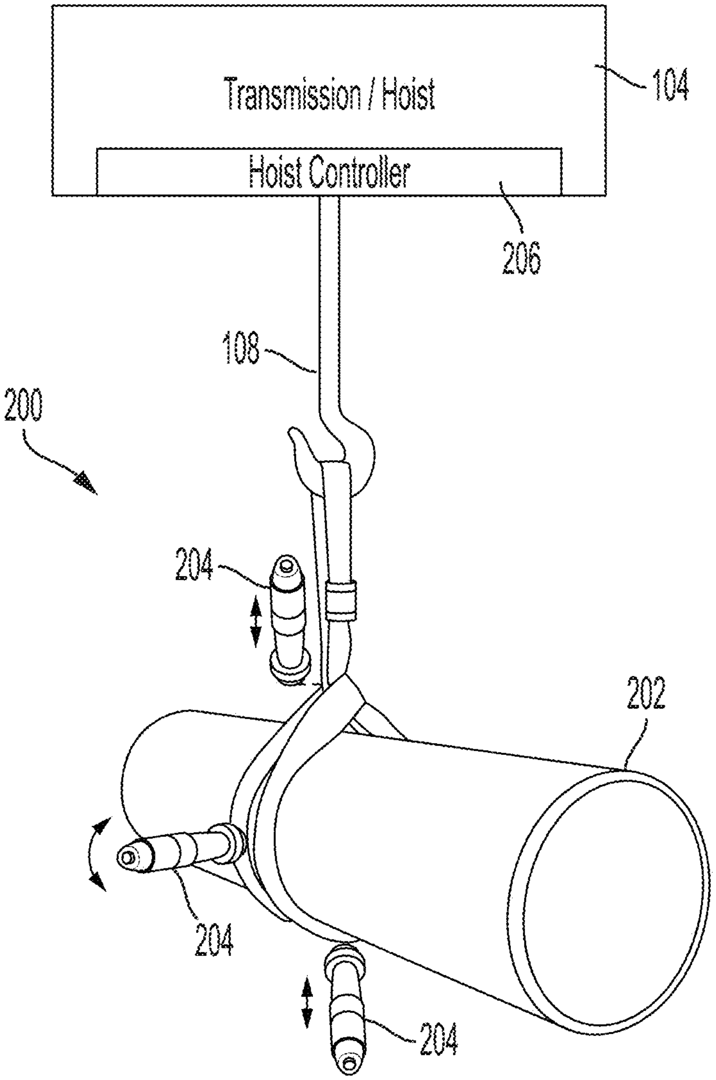
FIG. 2 illustrates an example of a hoist system with a zero-gravity remote control system, according to some embodiments.

Turning now to FIG. 2, a remote-control system for controlling a zero-gravity hoist system 200 is shown, according to some embodiments. For purposes of this disclosure, zero-gravity hoist systems are hoist systems that allow a user to perform fine manipulations of a load of the hoist system using minimal efforts. The hoist 104 is coupled to the load 202 via the load cable 108. The remote-control system includes one or more user operable remotes 204. The user operable remotes 204 are in communication with a hoist controller 206 of the hoist 104. The hoist controller 206 may be configured to control the operation of the hoist 104, and will be discussed in more detail below. The remotes 204 may communicate with the hoist controller via wired connection, or via a wireless connection, such as RF, NFC, Bluetooth, Bluetooth Low Energy, Wi-Fi, cellular (e.g. 3G, 4G, 5G, LTE, etc.) or other applicable wireless protocol.

In one embodiment the remotes may include one or more accelerometers configured to translate a movement of the remotes 204 in free space by a user. The accelerometers may provide a signal indicative of a movement of the remotes 204 to the hoist controller 206, which then controls the hoist 104 to move load 202 in a manner that corresponds to the movement of the one or more remotes 204. For example, a user may hold a remote 204 in a horizontal orientation and move the remote 204 up or down along a longitudinal axis. The accelerometers determine the movement of the remote 204 and transmit a signal indicative of the determined movement to the hoist controller 206, which then moves the load 202, via the hoist 104, in a manner that corresponds to the movement of the remote 204. In some embodiments, the amount of movement, e.g. movement along the longitudinal axis, may also be detected by the accelerometers, and used to control a speed of movement of the hoist 104 via the host controller 206. In some examples, the accelerometers within the remotes 204 may be configured to determine an orientation of the remote 204 (e.g. horizontal, vertical). The accelerometers can then determine a longitudinal movement of the remotes and provide that information to the hoist controller regardless of the orientation of the remote 204 when being operated by a user.

Figure 3:
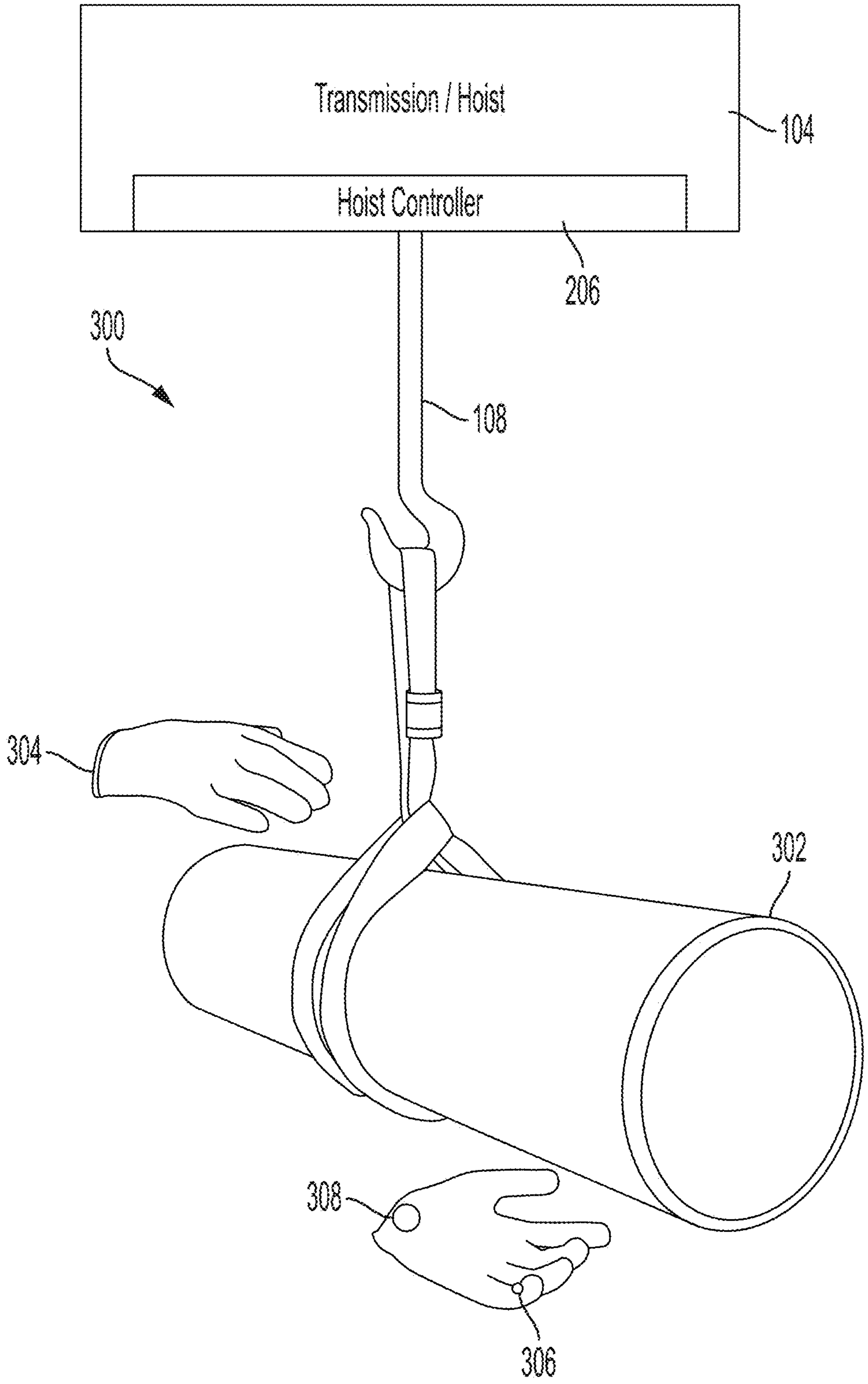
FIG. 3 illustrates an example of a hoist system with a glove controlled zero-gravity control system, according to some embodiments.

Turning now to FIG. 3, a touch-based hoist control system 300 is shown, according to some embodiments. The touch-based control system 300 is configured to allow a user to manipulate a load 302 by touching the load 302 using one or more hoist-controlling gloves 304. The hoist-controlling gloves 304 may include one or more load sensors 306 and one or more accelerometers 308. The load sensors 306 may be positioned at the fingertips and/or palm of the hoist-controlling gloves 304. In some examples, load sensors 306 may be placed on a single finger of the hoist-controlling gloves 304, each finger of the hoist-controlling gloves 304 or a portion of the fingers of the hoist-controlling gloves. The load sensors 306 allow a user to touch the load 302 thereby generating a load signal at the load sensors 306, which is then communicated to the hoist controller 206, such as described above. Further, the accelerometer 308 is configured to determine whether the user is applying the force to the load 202 in either an upward motion or a downward motion. The data from the accelerometer 308 is further provided to the hoist controller 206.

The hoist controller 206 may then control the hoist based on the amount of force applied by the user to the load sensors 306, as well as the accelerometer data from the accelerometer 308. For example, if the user applies a downward pressure on the load 302, the hoist controller 206, based on data from the load sensors 306 and the accelerometer 308, controls the hoist to lower the load. In some examples, the speed at which the load 302 is moved is controlled based on the amount of pressure applied by the user and measured by the load sensors 306. This can allow a user to control the movement of the load by touch only and allow for the user to stop movement of the load 302 simply by ceasing to touch the load 302. As described above, the use of the hoist-controlling gloves 304 may be used to allow a user to perform fine adjustments to a suspended load, whereas gross movements may be controlled using a standard hoist controller.

Figure 4:
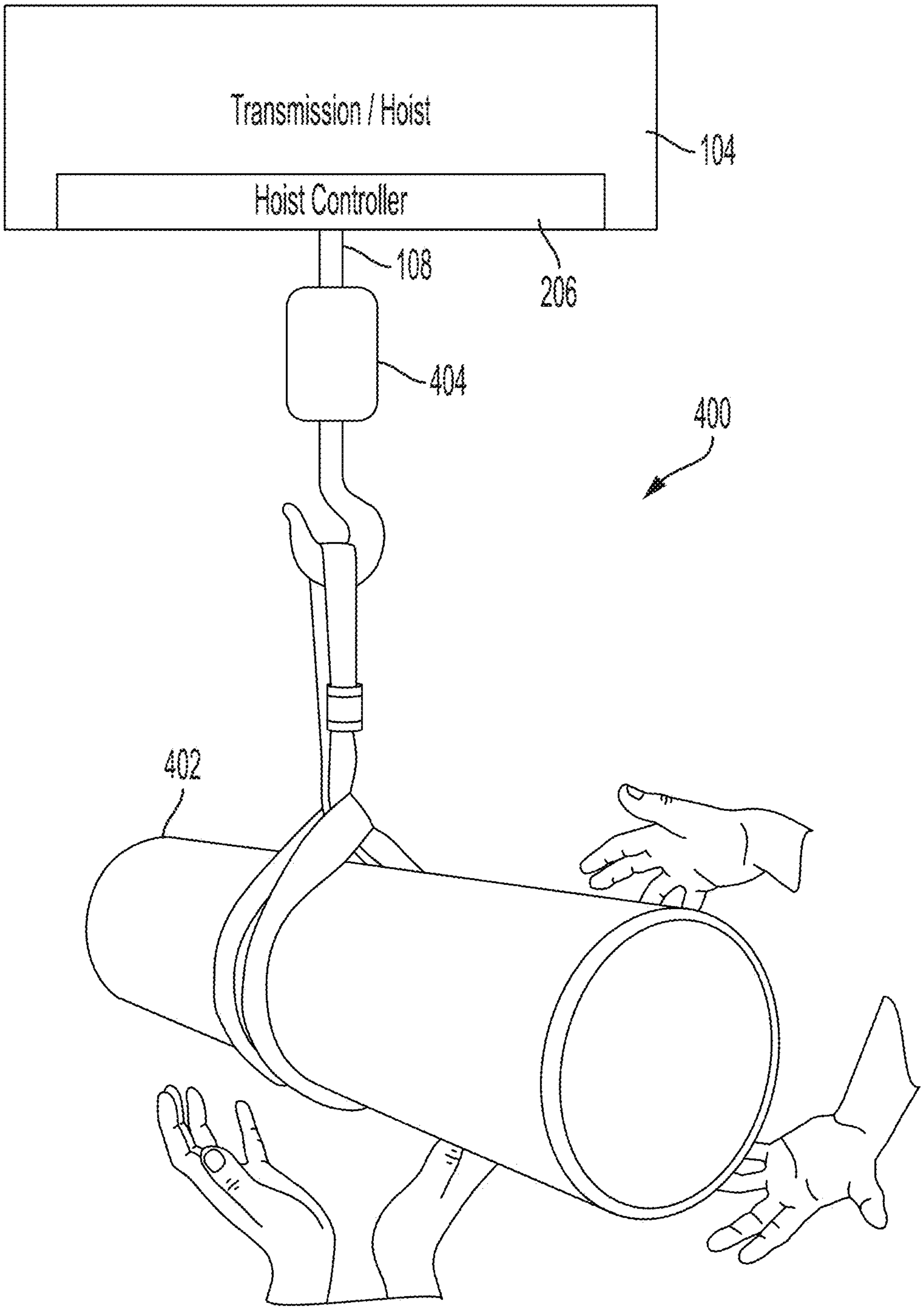
FIG. 4 illustrates an example of a hoist system with a load sensor based zero-gravity control system, according to some embodiments.

Turning now to FIG. 4, a zero-gravity hoist control system 400 is shown, according to some embodiments. The zero-gravity hoist control system 400 is configured for a user or users to manipulate a load 402 by simply touching or applying a force to the load 402. The zero-gravity hoist control system 400 includes a load sensor 404 on a load cable 108 of the hoist 104, between the hoist 104 and the load 402. By locating the load sensor 404 on the load cable 108 below the hoist 104, the load sensor 404 only needs to monitor the weight of the load and the rigging between the load sensor 404 and the load 402, and is not forced to measure the weight of the hoist 104, which may be substantial in some implementations. Further, where the weight of the hoist 104 is substantial (e.g. over 100 pounds) the weight of the hoist 104 can limit the load range of the load sensor 404. However, for example, where the hoist 104 is less than a substantial weight (e.g., less than 100 pounds), the load sensor 404 may be located between the hoist 104 and a support coupled to the hoist 104 (see FIG. 16). This placement can allow for a design that eliminates a wired electrical connection between the hoist 104 and the load sensor 404 that must run along the load cable 108 to provide communication between the hoist 104 and the load sensor 404. In some examples, this electrical connection can maximize the lifting height of the hoist 104. Further, removing the wired electrical connection along the load cable 108 prevents entanglements between the electrical connection and the load cable 108.

As will described in more detail below, the load sensor 404 may be configured to set a baseline of the load 402 when the load 402 is in a desired position (e.g., when gross movements are no longer required). The load sensor 404 may then detect changes in the load 402 and provide a signal indicative of those changes to the load controller 206. The load controller 206 may then control the hoist 104 to raise or lower the load 402 based on the determined change at the load sensor 404.

For example, a user may apply an upward force to the load 402, and the load sensor 404 detects a corresponding reduction in the measured load over the established baseline loading. This reduction is then provided to the hoist controller 206, which then controls the hoist 104 to raise the load. Similarly, a user may provide a downward pressure on the load 402, and the load sensor 404 will then subsequently detect a corresponding increase in the measured load over the established baseline loading. This increase in load is then conveyed to the hoist controller 206, which then controls the hoist 104 to lower the load 402. Once the change in load is removed, the hoist controller 206 can stop the hoist 104 to prevent additional movements of the load 402. In some embodiments, a minimum load change is required by the hoist controller 206 to initiate a movement of the load 402, such as ±5 lbs. However, other minimum load changes of more than 5 lbs. or less than 5 lbs. are also contemplated. In other embodiments, the load controller 206 may base the minimum on a percentage of the measured load, such as 1%. Thus, if the load weighs 1000 lbs., a change of 10 lbs. or more will be required to initiate a movement by the hoist controller 206. However, percentage of more than 1% or less than 1% are also contemplated. This allows for the load controller 206 to dynamically adjust to the mass of the load 402.

The zero-gravity hoist control system 400 allows for oscillations within the operation of the hoist 104 to be reduced by requiring positive feedback from the user input. For example, the force applied by the user directly correlates to the desired movement of the load, thereby reducing constant adjustments by a user using a known remote-control device to perform the fine manipulations of the load 402. Additionally, by requiring a user to physically manipulate the load 402 (i.e. apply an upward or downward force to the suspended load), accidental inputs are avoided as there must be an affirmative application of force to the load 402.

Figure 5:
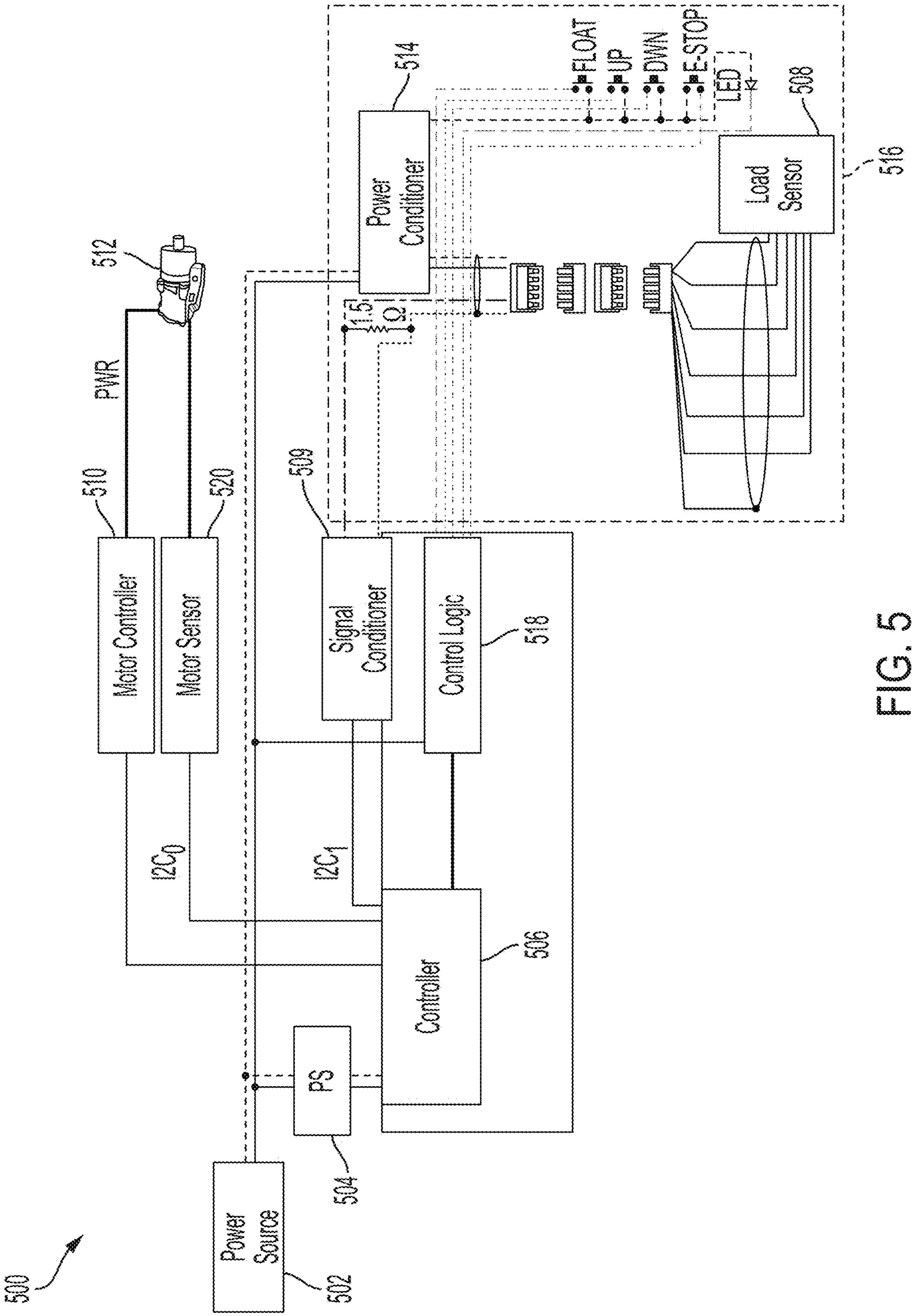
FIG. 5 is a block diagram of a zero-gravity hoist control system, according to some embodiments.

Turning now to FIG. 5, a block diagram of a hoist control system 500 is shown, accordingly to some embodiments. The hoist control system 500 is configured to control the zero-gravity hoist control system 400 described above. However, the hoist control system 500 could also be used to control the touch-based hoist control system 300 described above in regards to FIG. 3, and other hoist systems. The hoist control system 500 includes a power source 502, a controller power supply 504, a controller 506, one or more load sensors 508, a motor controller 510, a hoist motor 512, a power conditioner 514, and a remote control 516.

In one embodiment, the power source 502 is a removable battery pack, such as a lithium ion battery pack configured for use with a power tool. For example, the power source 502 may be an 18 VDC Li-Ion battery pack. In other examples, the power source 502 is a dedicated battery and/or an AC line connection (e.g. 120 VAC, 240 VAC, etc.). The power source 502 provides power to the controller power supply 504, which is configured to convert the power source voltage level to a voltage usable by the controller (e.g. 12V, 5V, 3.3V, etc.).

The controller power supply 504 provides power to the controller 506. In one embodiment, the controller 506 is an Arduino Due. However, the controller 506 may be other controller types, such an application specific integrated circuit (ASIC), a field programmable grid array (FPGA), a programmable microprocessor, a group of processing components, or other suitable electronic processing components. The controller 506 may be coupled to or include control logic 518. For example, in some embodiments, the control logic 518 may be software stored on a memory of the controller 506 that is executed by a processor of the controller 506, and in some embodiments, the control logic 518 includes a separate circuit or controller coupled to the controller 506. The control logic 518 is configured to determine how the hoist motor 512 should be controlled based on inputs provided by the motor controller 510, the load sensor 508, and/or the remote control 516. For example, the control logic 518 may be configured to perform the zero-gravity function as used by the zero-gravity hoist control system 400 described above. The control logic 518 associated with the zero-gravity hoist control system 400 will be discussed in more detail below.

The load sensor 508 is configured to detect a load on the hoist 104 or as applied to a load cable, such as when the hoist is lifting a load. As shown in FIG. 5, the load sensor 508 is located in the remote control 516. However, in other embodiments, the load sensor 508 may be located elsewhere within the zero-gravity hoist control system 400, as described herein. In some embodiments, the load sensor 508 includes one or more load cells for detecting a load on the load cable. In other embodiments, the load sensor 508 may include one or more strain gauges for determining a strain on the load cable. In one example, the load cells of the load sensor 508 may output a signal (e.g. 4-20 mA) based on a detected load. However, other outputs are contemplated. In still further embodiments, the load sensor 508 may be integrated into a tension meter coupled to the load cable. The tension meter may include a rotating arm and a spring position sensor to determine a tension on the load cable. Similar to the load sensors described above, the tension meter may provide an electronic signal to the controller 506 representative of a load on the load cable. In one embodiment, the output from the load sensor 508 may be fed to a signal conditioner 509, which may be configured to amplify and/or condition the output from the load sensor prior to the output being provided to the controller 506, as described below. While shown outside the remote control 516 in FIG. 5, it is contemplated that in some examples, the signal conditioner may 509 be located within the remote control 516.

In one embodiment, the load sensor 508 is coupled to the controller 506 via a wired connection. However, in other embodiments, the load sensor 508 may be connected to the controller 506 via a wireless connection, such as RF, Bluetooth, NFC, and the like. As will be described in more detail below, the load sensor 508 provides load data to the controller 506 which is then processed by the control logic 518 to ensure the proper control of the hoist motor 512.

The motor controller 510 is configured to control the hoist motor 512 based on a control signal provided by the controller 506. In some embodiments, the motor controller 510 is a dedicated motor controller for controlling a brushless DC motor. However, the motor controller 510 may be configured as other types of motor controllers depending on the hoist motor 512 type. The motor controller 510 may further include one or more sensor circuits 520. The sensor circuits 520 may be configured to receive sensor feedback data provided by the hoist motor 512. For example, where the hoist motor 512 is a brushless DC motor, the sensor circuits 520 are configured to receive Hall sensor data from the hoist motor. The Hall sensor data may be used by both the motor controller to control the operation of the hoist motor 512, as well as the controller 506 as feedback data relating to speed, position, etc. Other sensor data may include temperature data, motor speed data, etc.

The power conditioner 514 may be configured to provide conditioned power from the power source 502 to the remote control 516, and various components therein, such as the load sensor 508. In some embodiments, the power conditioner 514 is contained within the remote control 516. However, in other examples, the power conditioner 514 is separate from the remote control. Providing conditioned power to the remote control 516 can be used to reduce electrical noise in the remote-control circuit in order to improve operation. The remote control may be configured to allow a user to control specific functions of the hoist system 400. For example, the remote control 516 may have actuators or other inputs to perform various functions, such as UP, DOWN, or Emergency Stop (E-STOP). These controls may be used to perform gross movements of a hoist. The remote control may further include an actuator or other input to enact a "FLOAT" mode. The FLOAT mode may be used to enter a zero-gravity mode, as described above. For example, when the user actuates the FLOAT input, the controller 506 may determine a load on the hoist system, and, once the baseline load is established, allow the user to move the load up and down by applying a force to the load as described above. This control scheme is described in more detail below.

Figure 6A:
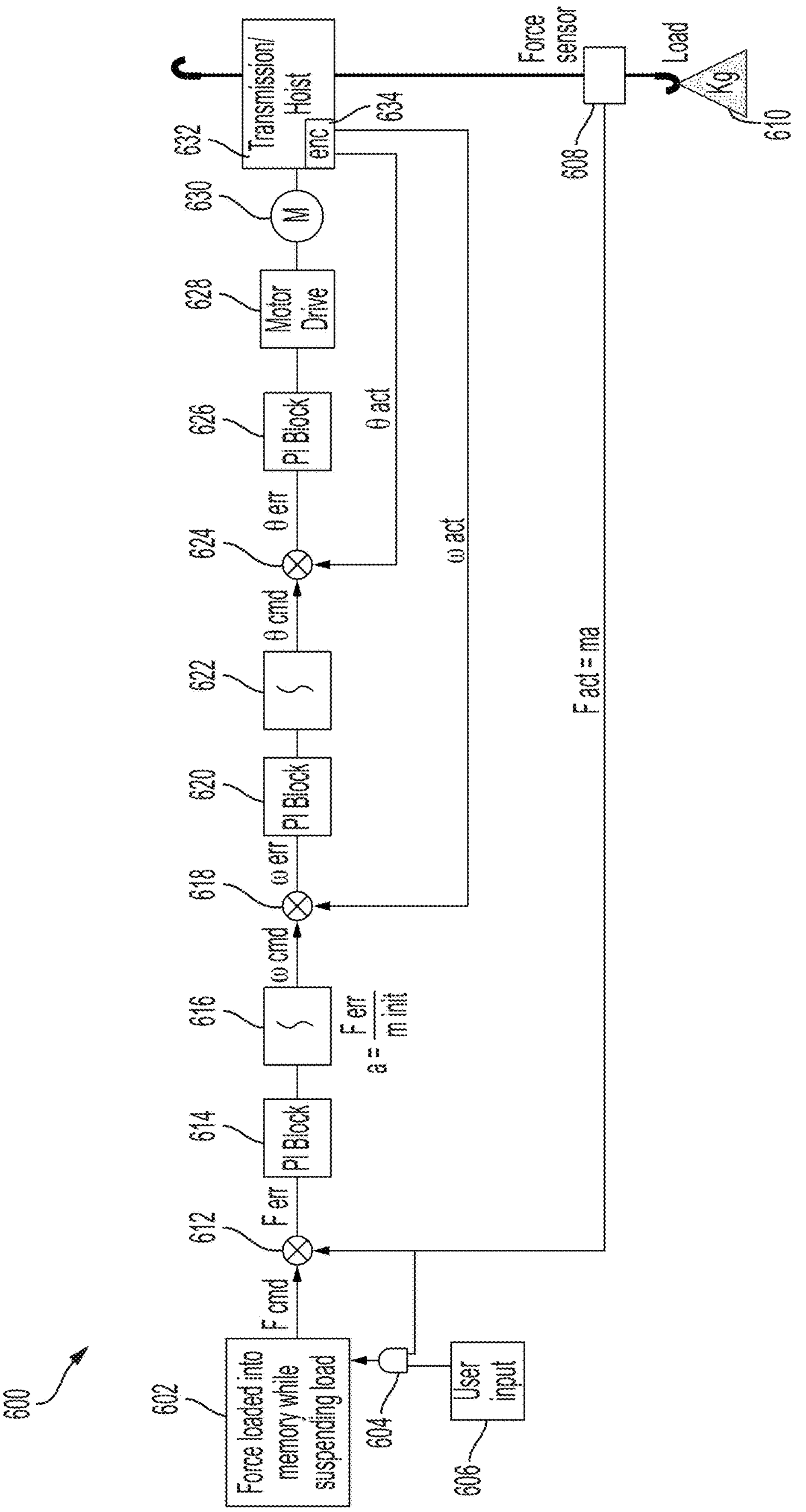
FIG. 6A is a control diagram for a load based zero-gravity hoist control system used in FIGS. 2 and 3, according to some embodiments.

Turning now to FIG. 6A, a control process 600 for controlling, for example, the zero-gravity hoist control system 400 described above is shown, according to one embodiment. The control process 600 may be executed by the control logic 518 within the controller 506, as described above. At process block 602, the control logic 518 loads a force into a memory (e.g., of the controller 506 or of the control logic 518) as the baseline force. The input to process block 602 may be combined via AND block 604, and may consist of a user input 606, and an input from a force sensor 608 representative of the load 610. The user input 606 may be provided via a remote control, such as the remote control 516 described above. For example, the user may actuate the "FLOAT" input of the remote control 516 to generate the user input 606, which may then be provided to the control logic 518 along with a force from the force sensor 608 to provide the baseline force stored in memory at process block 602.

The output of the process block 602 is then summed with a measured load from the force sensor 608 at summing block 612 to generate a signal representative of a difference between the current load and the baseline load. The output of the summing block 612 is then provided to a proportional-integral ("PI") block 614, and then into an integration block 616 to generate a velocity vector command signal. The velocity vector command signal is then provided to a summing block 618 along with an actual velocity of a hoist 632 provided by an encoder 634. The summing block 618 provides an error representative of the difference between the commanded velocity and the actual velocity. The velocity vector error is then provided to PI block 620, which then provides an output to integration block 622, which in turn generates a position command. The position command is then provided to a summing block 624 along with an actual position of the hoist 632 provided by the encoder 634. The summing block 624 then generates an error between the commanded position and the actual position. The position error is then provided to a PI block 626, which then outputs a position command to a motor drive 628 of the hoist 632, which then controls a hoist motor 630.

Figure 6B:
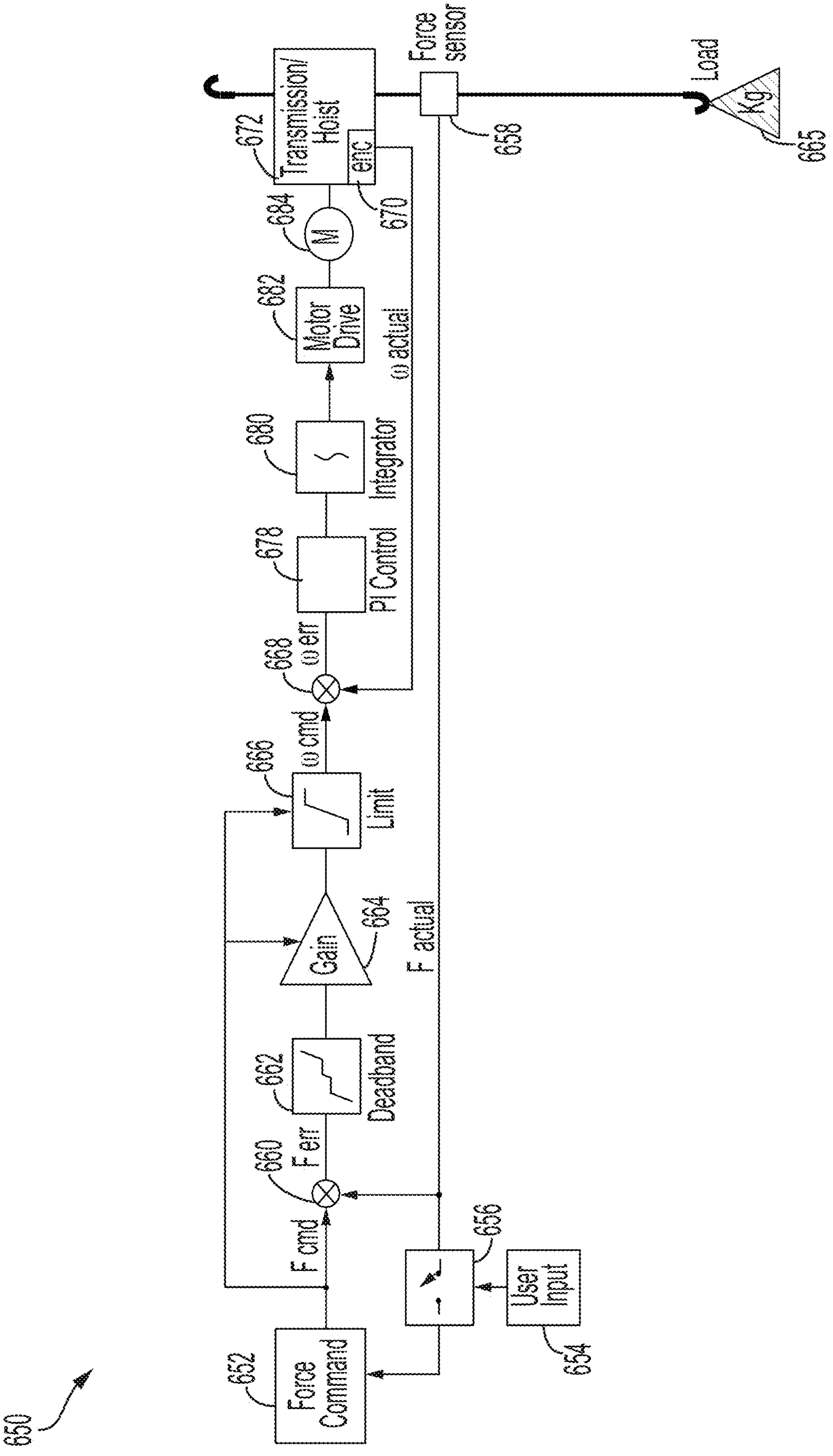
FIG. 6B is a control diagram for a load based zero-gravity hoist control system with dynamically adjustable gain and limits used in FIGS. 2 and 3, according to some embodiments.

Turning now to FIG. 6B, an alternative control process 650 for controlling, for example, the zero-gravity hoist control system 400 described above is shown, according to one embodiment. The process 650 provides adjustable limit and gain control, as will be described in more detail below, which allows for an increase in applied force producing a faster movement of the load. The control process 650 may be executed by the control logic 518 within the controller 506, as described above. At force command block 652, a user input 654 provides a force command though a first switch 656. The user input 654 may be provided via a remote control, such as the remote control 516 described above. The first switch may also be coupled to a force sensor 658. The force sensor 658 may be one of the force sensors described herein. While the force sensor 658 is shown as positioned on the load side of the hoist, it is contemplated that in some examples the force sensor 658 may be between the hoist and a support from which the hoist is suspended, as described herein. The first switch 656 may be configured to be controlled by the user input 654 to provide the actual (measured) force to the force command block 652. For example, the user may actuate the "FLOAT" input of the remote control 516, which can control the switch 656 to provide the actual (measured) force as the force command from the force sensor 658 to the force command block 652.

The output of the force command block 652 is then summed with the actual force received from the force sensor 658 to generate a force error signal representative of a difference between the current force and the desired force at summing block 660. The output of the summing block 660 is provided to deadband module 662. Deadband module 662 is configured to determine whether the difference value output from the summing block 660 is within a deadband of the input values (i.e. is the difference sufficient to generate a response). The output from the deadband module 662 is provided to gain amplifier 664 along with the force command signal. The gain amplifier 664 also receives the force command signal. As stated above, in some instances, the force command is equivalent to the force applied by a load 665 (e.g., when the FLOAT mode is engaged). In one embodiment, the gain amplifier 664 dynamically amplifies the force error signal based on the force command signal being lifted. This amplification can thereby require a user to exert a greater force on the load in order for the load to move. The gain amplifier 664 provides the amplified output to a dynamic limit module 666.

The dynamic limit module 666 may be configured to limit the output of the gain amplifier 664 based on predetermined limit values. In one embodiment, the predetermined limit values are configured to prevent large changes from occurring where the force command may be substantially different than the actual force. The dynamic limit module 666 can dynamically limit a velocity vector command output. In one embodiment, the velocity vector command is dynamically limited to produce different maximum velocity commands according to the weight of the load 665 being lifted (e.g. the force command). As shown in FIG. 6, the force command signal is an input to the dynamic limit module 666. By limiting the velocity vector command output based on a weight of the load, the velocity vector can be limited to reduce the maximum velocity vector for heavier loads. This is due to heavier loads having a higher inertia thereby requiring more effort to maneuver than a lighter load.

The output from the limit module 666 is a velocity vector command signal that is provided to a velocity summing module 668 along with an actual velocity vector value from an encoder 670 associated with a hoist system 672. The hoist system 672 may be configured as one of the hoist systems described herein. The output of the summing module 668 is provided to a proportional-integral (PI) control block 678. The PI control block 678 provides an output to an integrator module 680. In some embodiments, the PI control block 678 may be a proportional-integral-derivative (PID) control block. The integrator module 680 is configured to output a control signal to the motor drive 682, which is configured to control the hoist motor 684 based on the received control signal.

Figure 7:
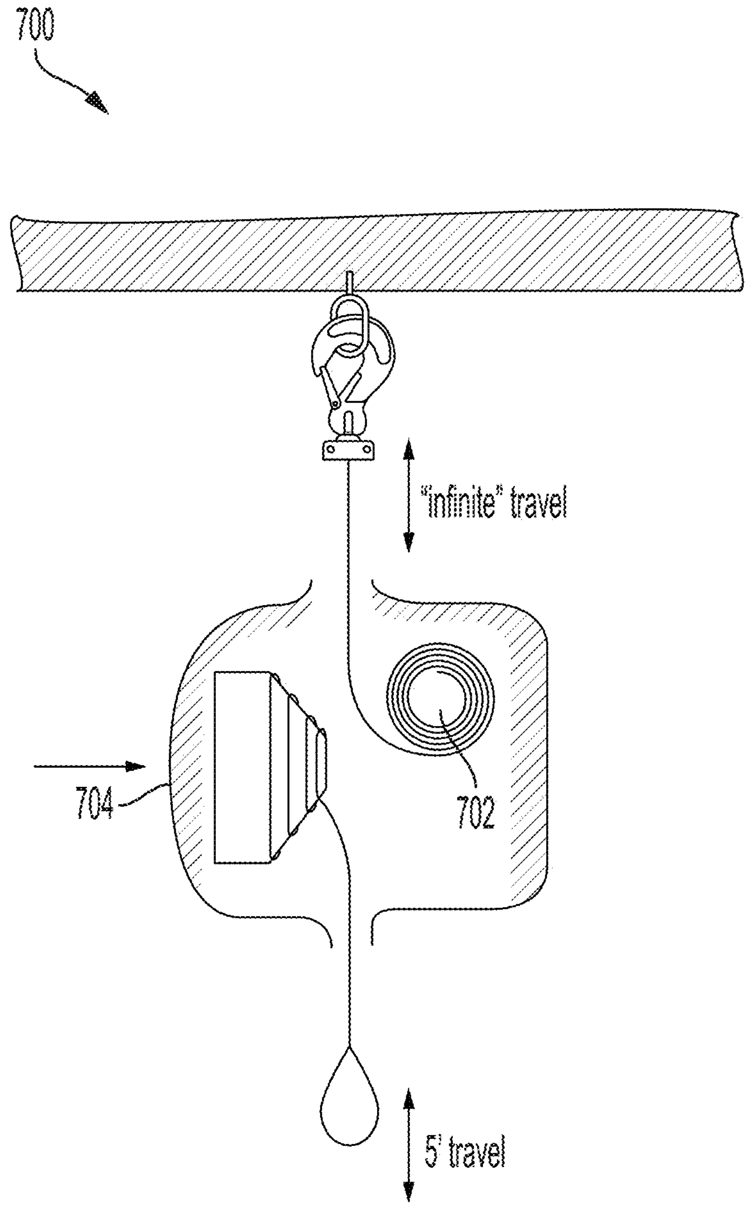
FIG. 7 illustrates an example of a hoist system with a mechanical/electrical hybrid zero-gravity control system, according to some embodiments.

Turning now to FIG. 7, a hybrid electrical/mechanical hoist system 700 is shown, according to some embodiments. The hybrid hoist system 700 includes an electric motor 702 for gross travel, and a zero-gravity mechanical system 704 for performing fine movements within a limited range. For example, the zero-gravity mechanical system 704 may allow for five feet of travel; however, distances of more than five feet and less than five feet are contemplated. The zero-gravity mechanical system 704 may be a fully mechanical system which allows for manipulation of a load by a user applying a minimal force.

Figure 8:
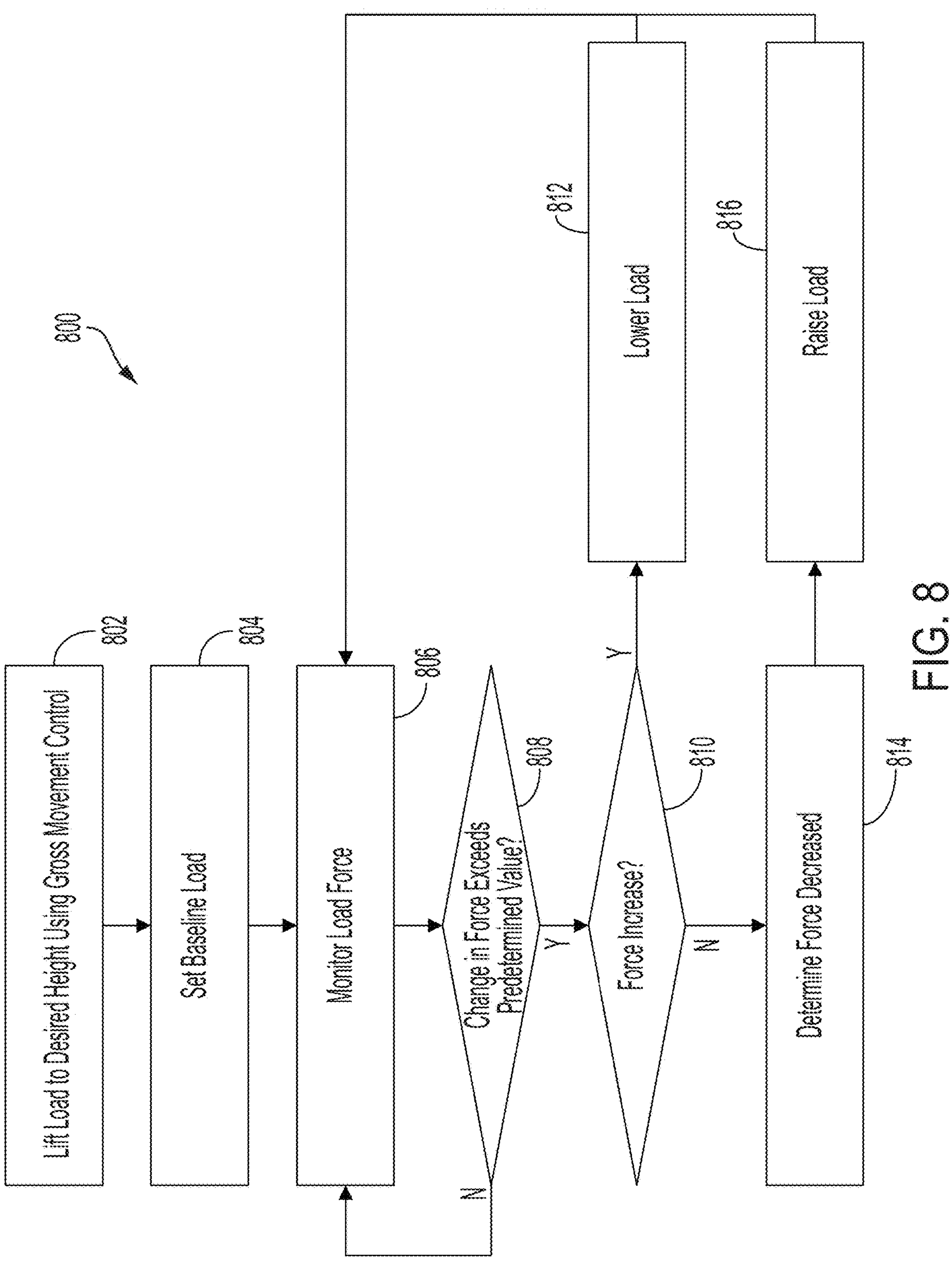
FIG. 8 is a flow chart illustrating a process for controlling a zero-gravity hoist control system, according to some embodiments.

Turning now to FIG. 8, a flow chart illustrating a process 800 for operating a zero-gravity hoist, such as the hoist system 200, 300, or 400, is shown, according to some embodiments. At process block 802 a load is lifted by a hoist, as described above. For example, a user may use a remote control to lift a load to a desired height. Once the load is at the desired height, the user sets the baseline load at process block 804. In one example, the user sets the baseline load by actuating the FLOAT input on a remote control 516, as described above. Once the baseline load has been set, the load is monitored at process block 806. In one embodiment, a controller, such as controller 506 monitors the load via one or more load sensors, such as load sensors 508, described above.

At process block 808, the controller 506 determines if there is a change in force associated with the load that exceeds a predetermined value. In some examples, the predetermined value is a static or user-settable value, such as five pounds. However, other values of more than five pounds or less than five pounds are also contemplated. In still other examples, the predetermined value may be a percentage of the load weight, such as 1%. However, values or more than 1% or less than 1% are contemplated. If a change in force does not exceed the predetermined value, the controller continues to monitor the load force at process block 806. Where the change in force does exceed the predetermined value, the controller then determines whether the force increased at process block 810. In response to determining that the force has increased, the controller 506 lowers the load at process block 812 as an increase in load is indicative of a user applying a downward force on the load.

In response to the force being determined to not have increased at process block 810, the controller 506 then determines that the force has decreased at process block 814. In response to determining that the force has decreased, the controller 506 raises the load at process block 816, as a decrease in load is indicative of a user applying an upward force on the load. Once the load is lowered at process block 812, or raised at process block 816, the controller 506 continues to monitor a load force at process block 806 to determine if any other changes to the load occur.

In some embodiments, the speed of the lowering and raising is proportional to the amount of downward and upward force sensed, respectively. For example, if an operator lightly pushes down on the load, the motor will slowly lower the load, while if the operator pushes down with more force, the load will be more quickly lowered. Similarly, if an operator lightly pushes upward on the load, the motor will slowly raise the load, while if the operator pushes upward on the load with more force, the load will be more quickly raise.

Figure 9:
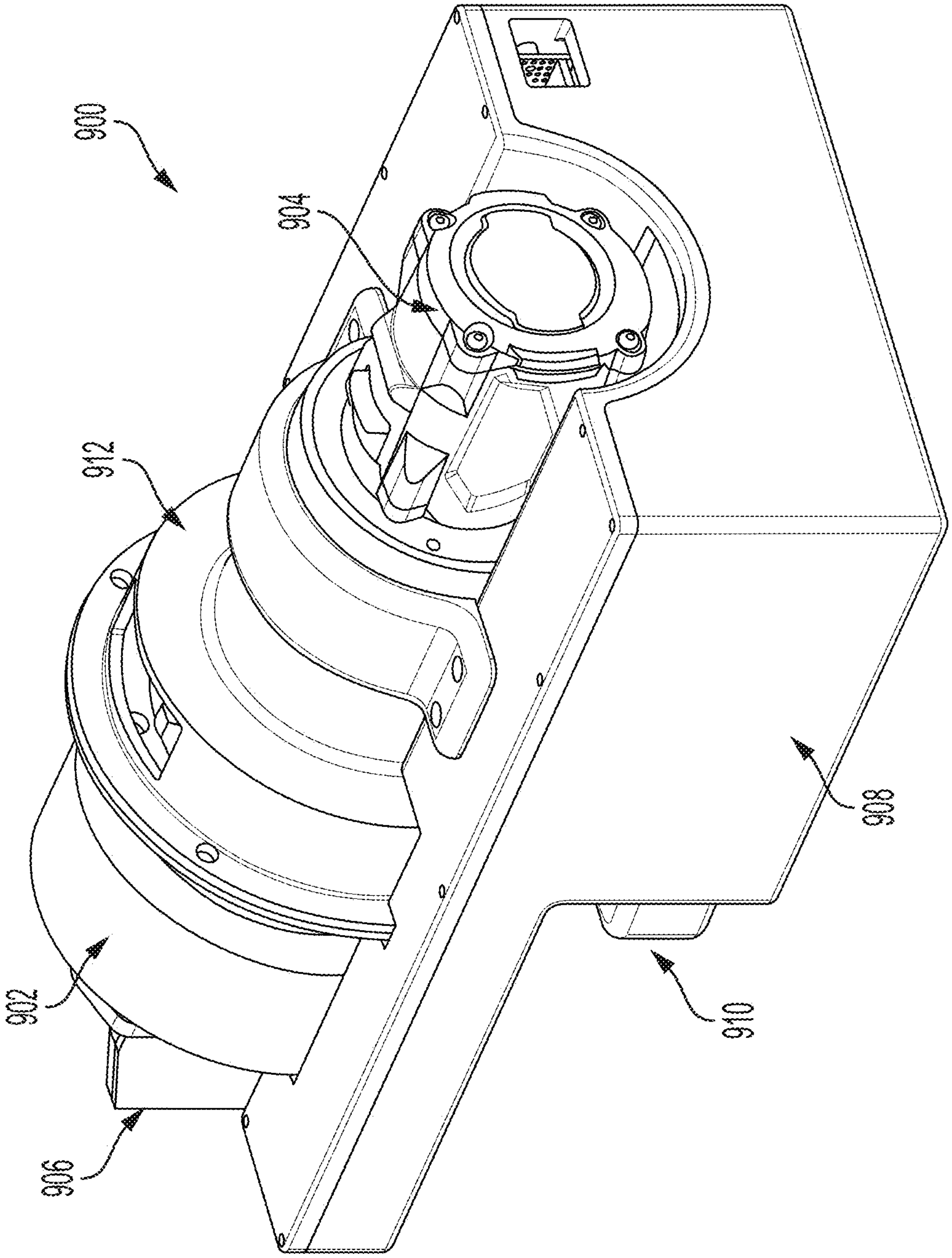
FIG. 9 is a perspective view of a zero-gravity chain hoist, according to some embodiments.

Turning now to FIG. 9, an exemplary zero-gravity chain hoist 900 is shown according to some embodiments. The zero-gravity chain hoist 900 includes a manual chain fall 902 coupled to a driver motor 904. In one embodiment, the driver motor 904 is a brushless DC motor such as those used in battery powered power tools. The zero-gravity chain hoist 900 further includes a power source adapter 906 to allow for the zero-gravity chain hoist to accept a battery pack, such as a power tool battery pack. In some examples, the battery pack is a lithium ion rechargeable battery pack. The zero-gravity chain hoist 900 further includes an electronics housing 908 for housing electronics associated with the zero-gravity chain hoist 900, such as those described above. The zero-gravity chain hoist 900 further includes a strain relief connector 910 for connecting a compressed air supply to the zero-gravity chain hoist 900. Finally, the zero-gravity chain hoist 900 includes a transmission 912. The transmission 912 is configured to couple the driver motor 904 to the manual chain fall 902. The transmission 912 may include a series of reduction gears such that the drive motor 904 may feel similar forces to a user when manually using the chain hoist.

Figure 10:
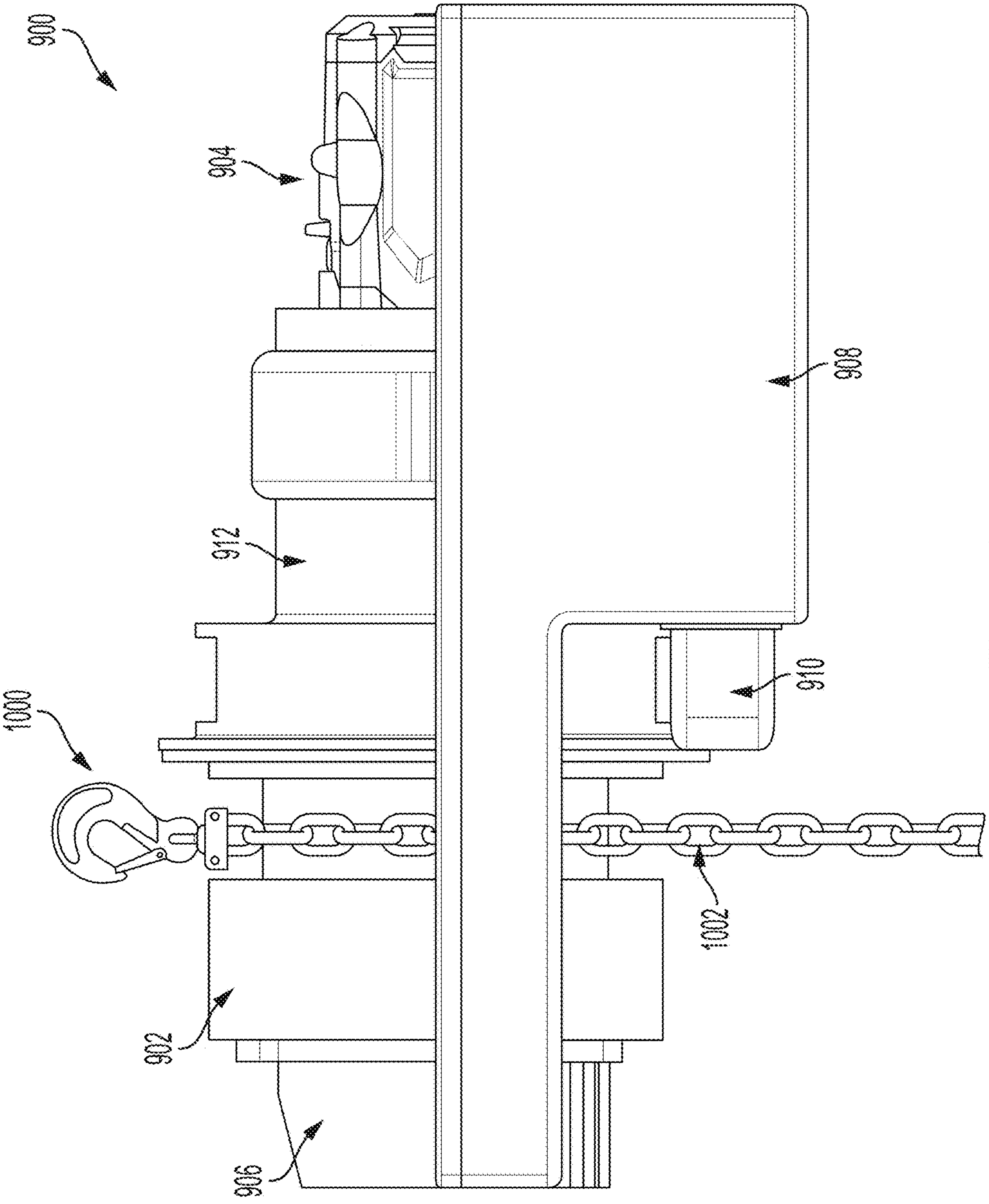
FIG. 10 is a side view of the zero-gravity chain hoist of FIG. 9, according to some embodiments.

FIG. 10 shows a side view of the zero-gravity chain hoist 900, and further illustrates a chain fall hook 1000 and lifting chain 1002. The chain fall hook is used to couple the zero-gravity chain hoist 900 to a support, such as shown in FIG. 1, above. The lifting chain 1002 may be coupled to a load and used to move and support a load using the zero-gravity chain hoist 900. In one example, a hook, similar to the chain fall hook 1000, is provided at a lower end of the lifting chain 1002, and the hook is configured to be coupled to the load to be moved using the zero-gravity chain hoist 900. In other examples, other connector mechanisms are provided at the end of the lifting chain 1002, such as a strap, a basket, a gripping device, and the like.

Figure 11A:
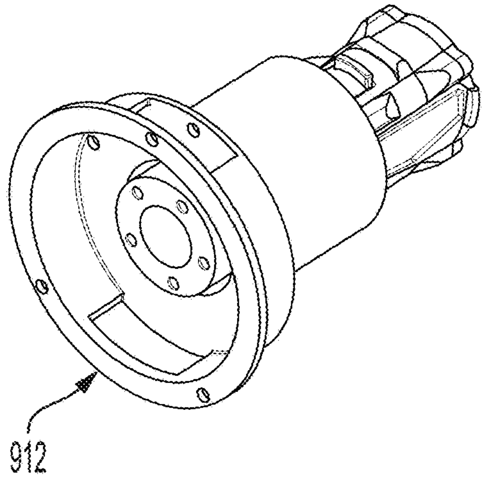
FIGS. 11A-11C are multiple views of the drive motor and transmission of the zero-gravity chain hoist of FIG. 9, according to some embodiments.
Figure 11B:
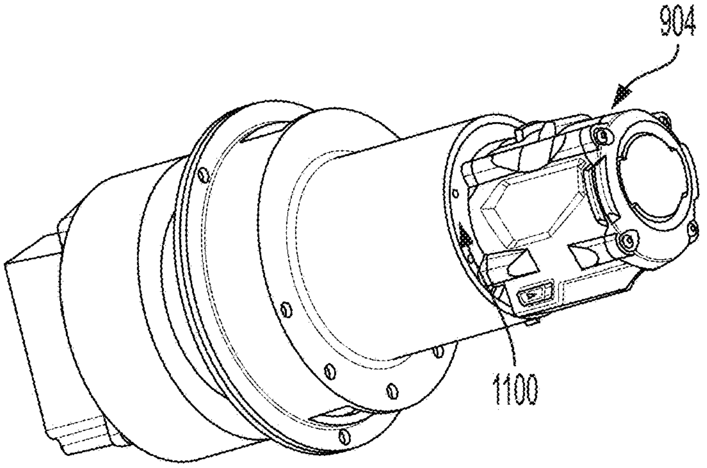
Figure 11C:
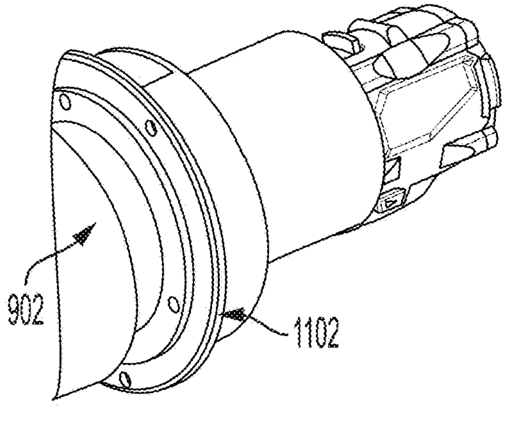

FIGS. 11A-11C illustrate multiple views of the drive motor 904 combined with the transmission 912 within the zero-gravity chain hoist 900. As shown in FIGS. 11A-11C, the drive motor 904 is screwed or otherwise coupled into a support collar 1100 that is in turn coupled to a housing of the transmission 912. The housing of the transmission 912 is configured to couple the drive motor 904 to the chain fall 902. An interface plate 1102 is used to couple the transmission 912 to the manual chain fall 902 using the mounting holes on the manual chain fall 902 housing.

Figure 12A:
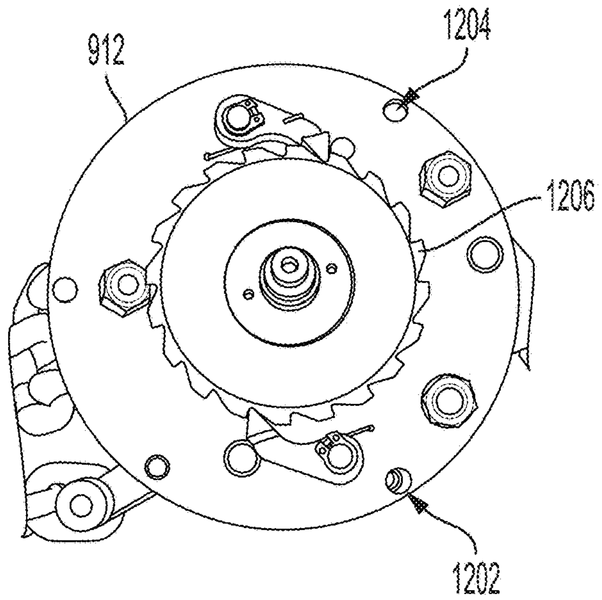
FIGS. 12A-12C illustrate the transmission of the zero-gravity chain hoist of FIG. 9.
Figure 12B:
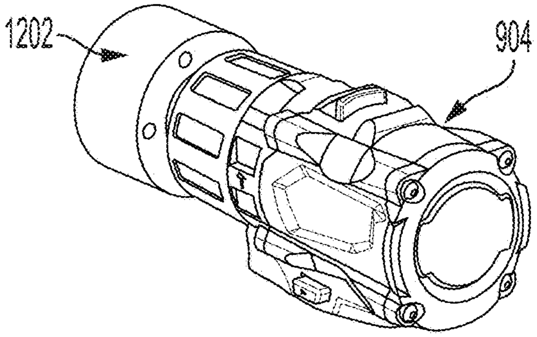
Figure 12C:
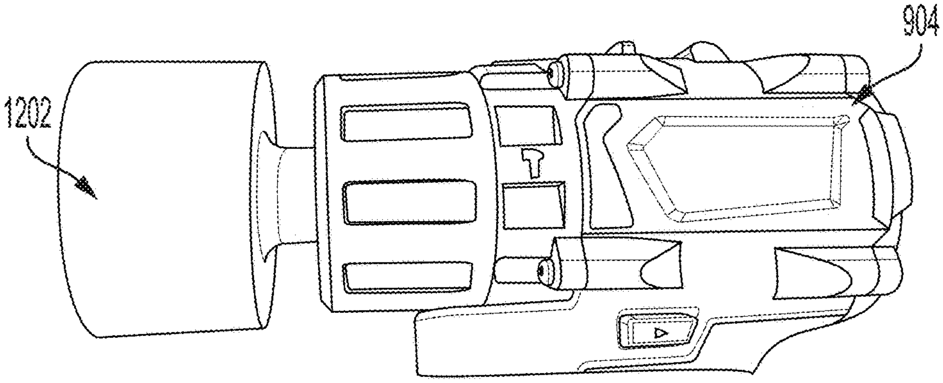

Turning now to FIGS. 12A-12C, a portion of the transmission 912 of the zero-gravity chain hoist 900 is shown in more detail. In FIG. 12A, a transmission hub 1202 is shown which couples the drive motor 904 to the zero-gravity chain hoist 900. The transmission hub 1202 has multiple mounting holes 1204 that are used to couple to the manual chain fall 902. For example, the mounting holes 1204 may be configured to allow for dowel pins on the manual chain fall 902 to slip fit into the mounting holes 1204. A sprocket 1206 within the transmission hub is then configured to drive the chain fall up and down depending on a direction of rotation provided by the drive motor.

The sprocket 1206 is configured to ratchet multiple times per revolution of the hoist. The ratcheting of the sprocket 1206 is configured to hold the load if the motor and/or transmission were to fail and/or in a low power saving mode where the motor is relaxed to conserve battery or battery pack power. In some embodiments, the ratcheting mechanism within the sprocket 1206 can hold the load during a FLOAT mode, a static mode, or after a predetermined period of time has passed (e.g. 5 minutes) to reduce the strain on the drive motor 904 by allowing hoist pulley to rest on the ratcheting device. In some embodiments, a sensed or detected change in force applied to the zero-gravity chain hoist 900. In addition to removing strain from the drive motor 904, by allowing the hoist pulley to rest on the ratcheting device, power can be conserved, which can extend the life of a battery or battery pack in a battery or battery pack powered hoist as described herein. FIGS. 12B-12C further show the transmission hub 1202 coupled to the drive motor 904.

Figure 13A:
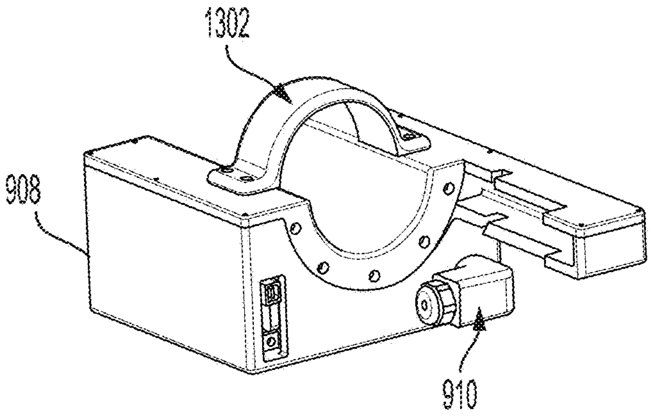
FIGS. 13A-13C illustrate the electronics housing of the zero-gravity chain hoist of FIG. 9, according to some embodiments.
Figure 13B:
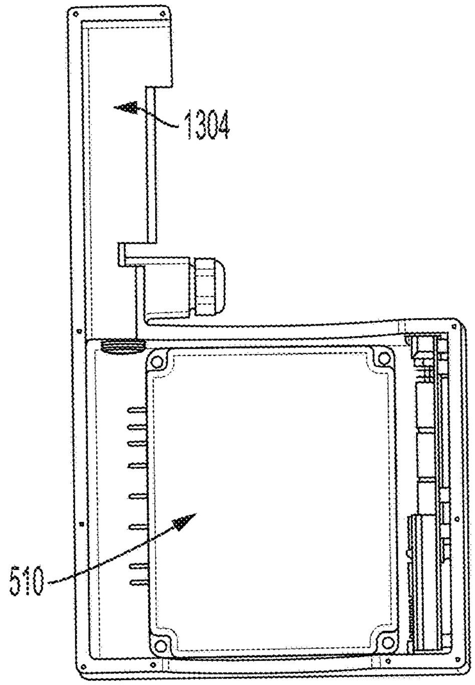
Figure 13C:
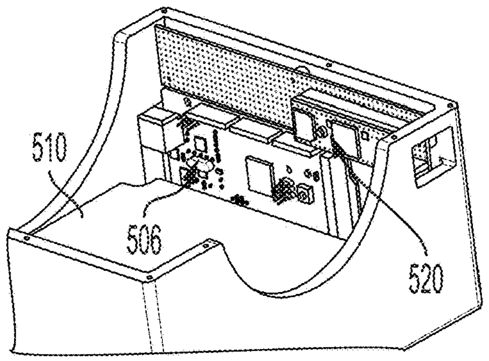

Turning now to FIGS. 13A-13C, multiple views of the electronics housing 908 associated with the zero-gravity chain hoist 900 are shown, according to some embodiments. In some embodiments, electronics housing 908 houses some or all of the components described in FIG. 5, above. The electronics housing 908 may include a housing collar 1302 for coupling to the housing of the transmission 912. The electronics housing 908 may further include the strain relief connector 910 as described above. A channel 1304 for routing power from the power source adapter 906 to the drive motor 904 is shown in FIG. 13B. Further, as shown in FIGS. 13B and 13C, the electronics housing 908 houses the controller 506, the sensor circuits 520, and the motor controller 510, as described above.

Figure 14A:
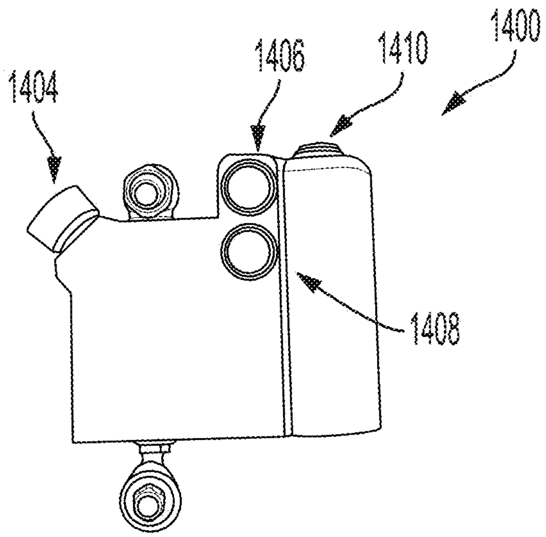
FIGS. 14A-14B illustrate the remote control of a zero-gravity hoist system, according to some embodiments.
Figure 14B:
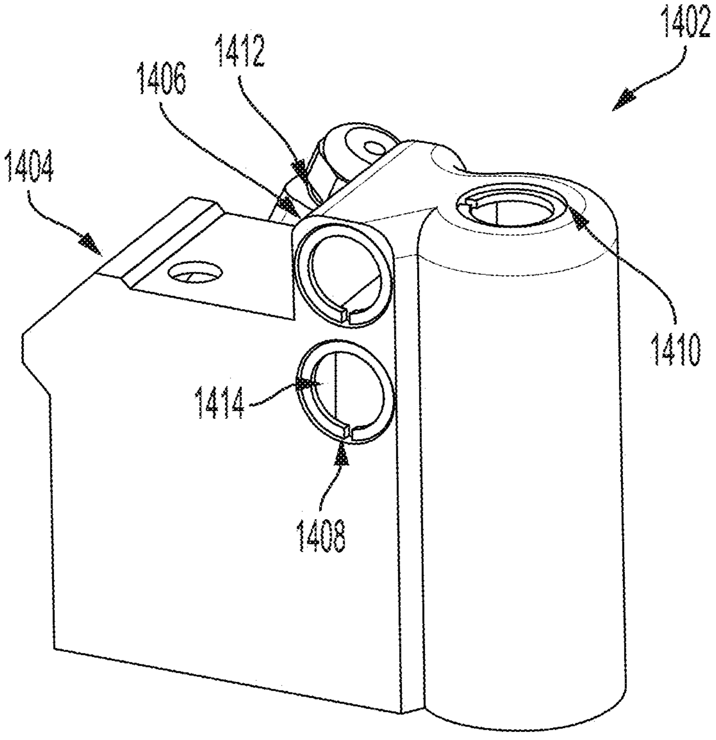

Turning now to FIGS. 14A-14B, an example of the remote control 516 described above is shown, according to some embodiments. In some embodiments, there may be two different housings for the remote control 516. For example, a first remote control body 1400 may be located at the top of the assembly attached to the hoist body, and a second remote control body 1402 may be coupled to the bottom of the zero-gravity chain hoist 900 assembly, and linked in the chain just above a load hook.

The first remote control body 1400 includes an E-STOP input 1404, an UP input 1406, a down input 1408, and a FLOAT input 1410. The second remote control body 1402 also includes similar inputs. The second remote control body 1402 further includes an air hose connector 1412, and a load sensor 1414. As described above, the second remote control body 1402 may be linked into the lifting chain 1002 above a load hook to allow for the load sensors 1414 (e.g. load sensors 508 described above) to determine a load on the lifting chain 1002 indicative of the load being hoisted by the zero-gravity chain hoist 900.

Figure 15:
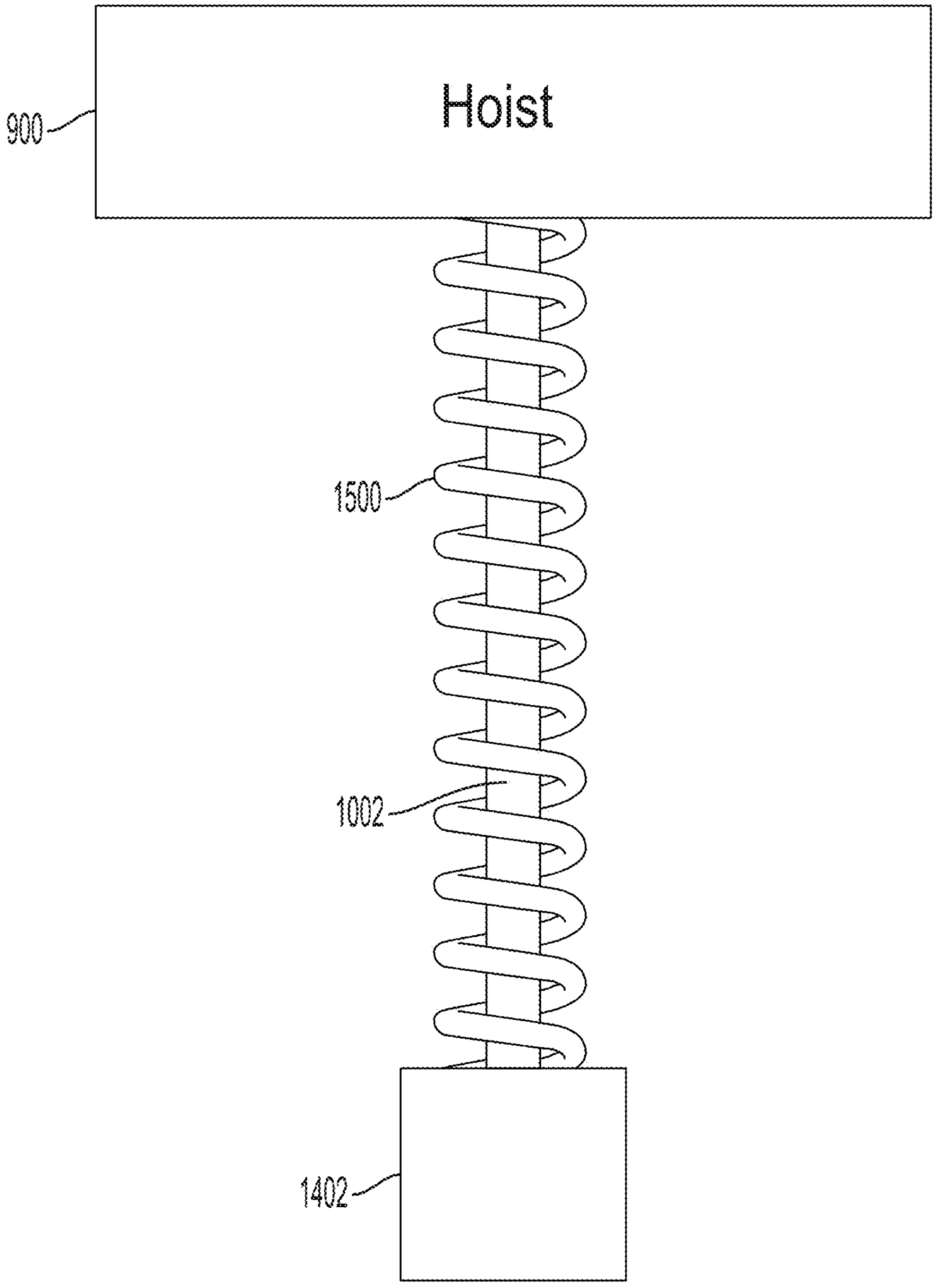
FIG. 15 illustrates a connection between the zero-gravity chain hoist of FIG. 9 and the remote control of FIG. 14B.

Turning now to FIG. 15, a connection between the zero-gravity chain hoist 900 and the second remote control body 1402 is shown. The second remote control body 1402 is coupled to the zero-gravity chain hoist 900 via both the lifting chain 1002 and a coiled control wire 1500. The coiled control wire 1500 can contract and expand with the length of the lifting chain.

Figure 16:
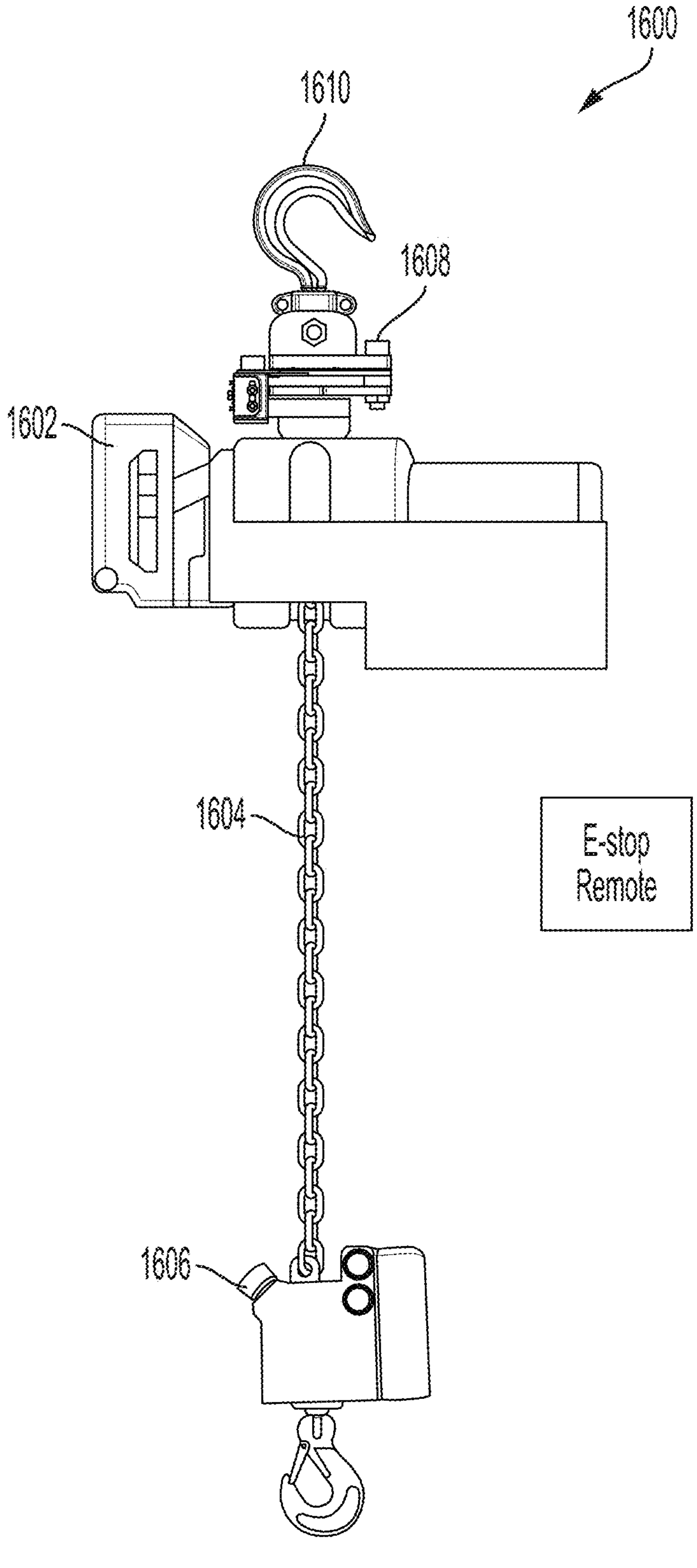
FIG. 16 illustrates a hoist system having a load sensor between a hoist and a support member, according to some embodiments.

Turning now to FIG. 16, an alternative hoist system 1600 is shown having a battery pack powered hoist 1602 coupled to a load chain 1604 and including a remote control 1606. The battery pack powered hoist 1602 and the remote control 1606 may be similar to the hoist and remote controls described above. The hoist system 1600 further includes a load sensing assembly 1608 integrated into a hoist mounting hook 1610. As stated above, by placing the load sensing assembly 1608 above the battery pack powered hoist 1602, no electrical connections are required along the load chain 1604.

Figure 17A:
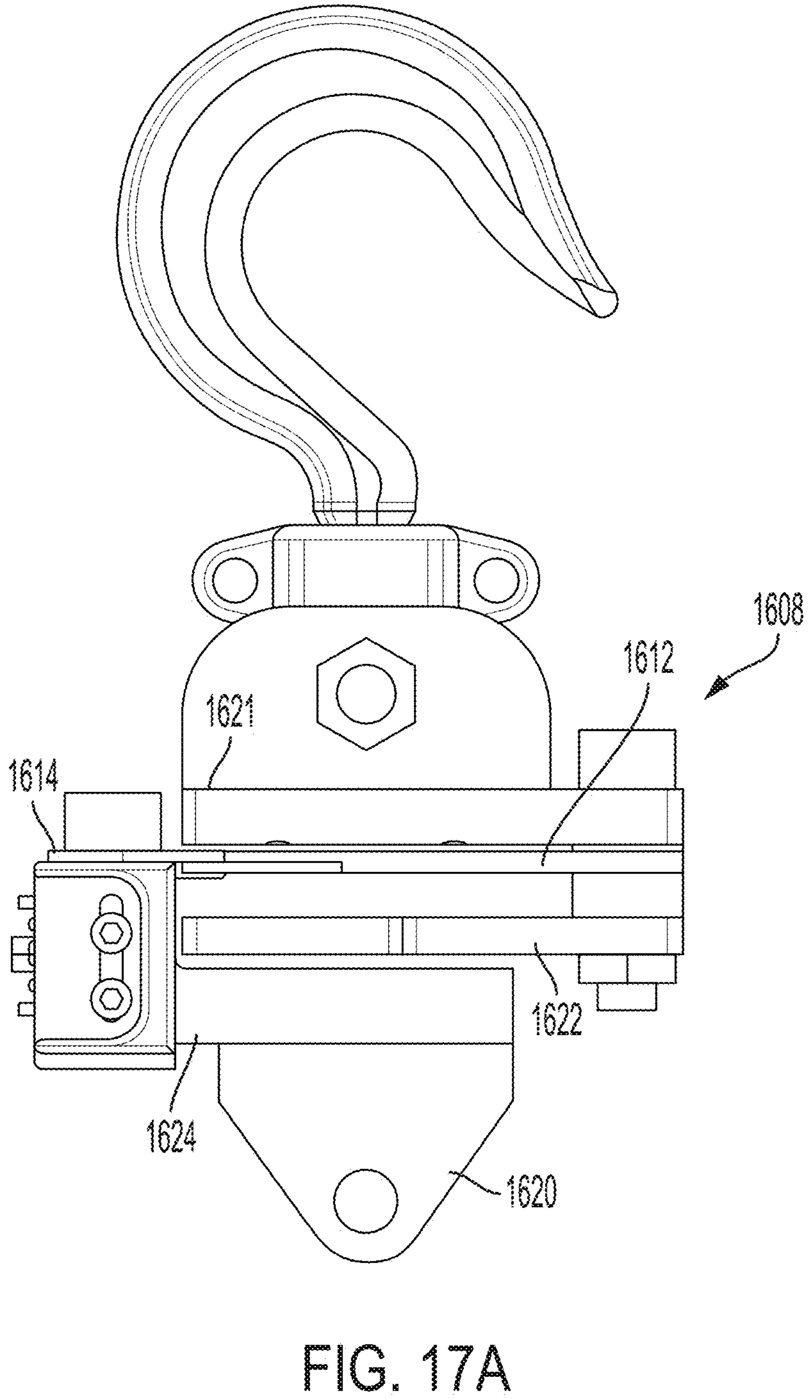
FIG. 17A is a side view of a hoist mounting hook with an integrated load sensor, according to some embodiments.
Figure 17B:
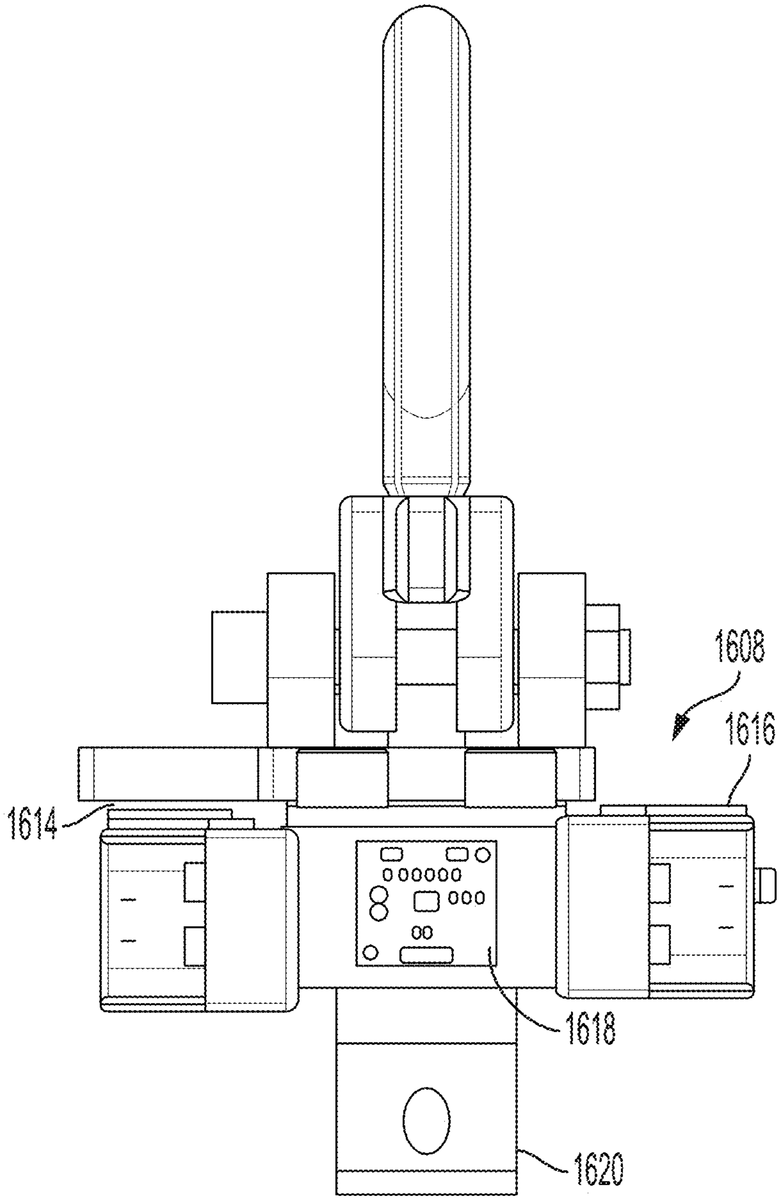
FIG. 17B is a rear view of a hoist mounting hook with an integrated load sensor, according to some embodiments.
Figure 17C:
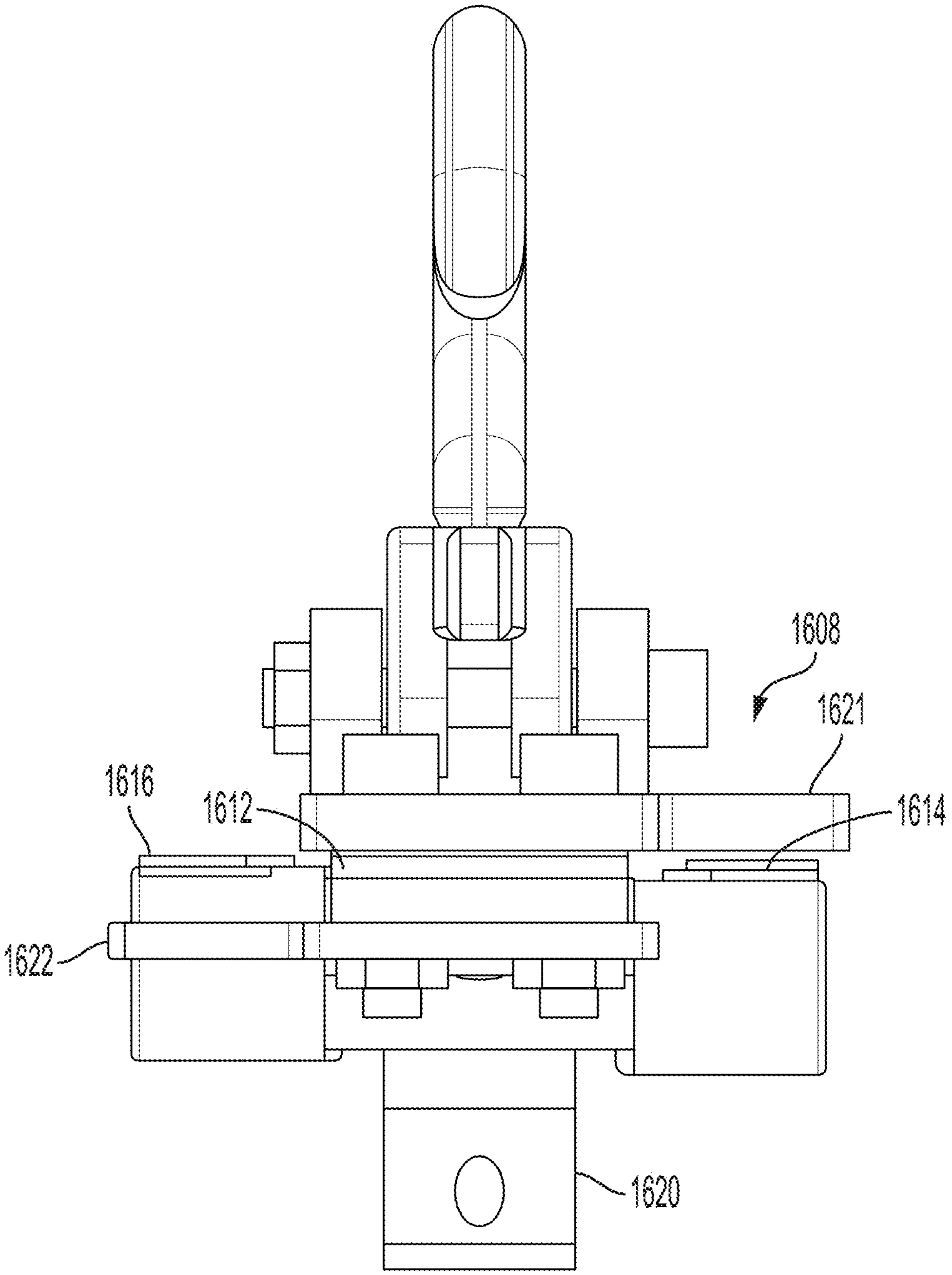
FIG. 17C is a front view of a hoist mounting hook with an integrated load sensor, according to some embodiments.
Figure 17D:
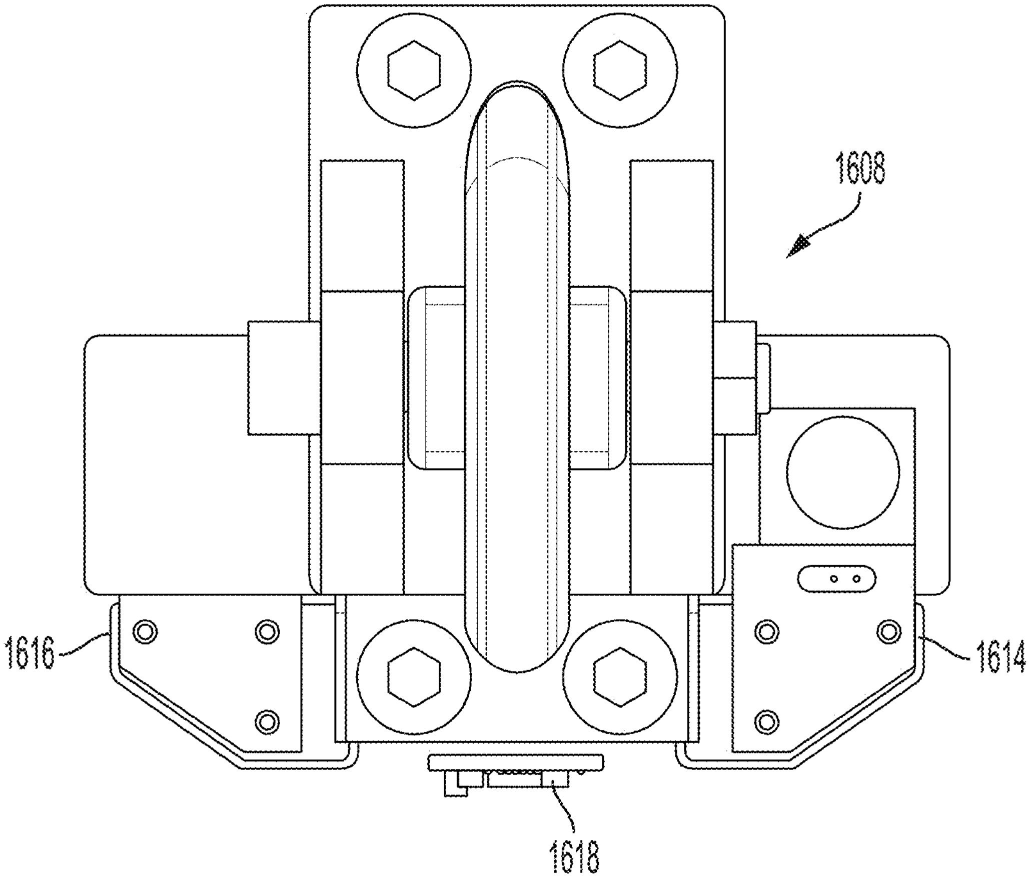
FIG. 17D is a top view of a hoist mounting hook with an integrated load sensor, according to some embodiments.

Turning now to FIG. 17A, a side view of the hoist mounting hook 1610 of FIG. 16 is shown, according to some embodiments. As stated above, the hoist mounting hook 1610 includes a load sensing assembly 1608. The load sensing assembly 1608 includes a plate (e.g., spring plate) 1612. As shown in FIGS. 17B-17D, the load sensing assembly further includes a first sensor 1614 and a second sensor 1616. In one embodiment, the sensors are inductive load sensors. Inductive load sensors are configured to produce an electrical output that is proportional to a magnetic field sensed by the sensors. The sensors 1614, 1616 are configured to measure a deflection of the spring plate 1612, which is dependent on a load applying a downward force on a load connector 1620, thereby causing the spring plate 1612 to move. For example, as shown in FIG. 17A, as the load in increased on the load connector 1620, the spring plate 1612 deflects such that the distance between a first fixed conductive plate 1621 and a second fixed conductive plate 1622 of the load sensing assembly 1608 changes. The load may include the weight of a hoisted load, as well as the weight of the battery pack powered hoist 1602. In one embodiment, the spring plate 1612 is a leaf spring. However, other spring types are also contemplated.

To measure a deflection of the spring plate 1612, the first sensor 1614 induces an electrical signal on the surface of the first fixed conductive plate 1621 and the second sensor 1616 induces an electrical signal on the surface of the second fixed conductive plate 1622. However, it is contemplated that in some examples, the first sensor 1614 induces an electrical signal on the surface of the second fixed conductive plate 1622 and the second sensor 1616 induces an electrical signal on the surface of the first fixed conductive plate 1621. The sensors 1614, 1616 are, for example, able to output an electrical signal to the respective fixed conductive plates, which is then carried by the electrically conductive surface. The first sensor 1614 and the second sensor 1616 each include an antenna (e.g. a wireless sensor) configured to measure the electrical signals applied to the fixed conductive plates 1621, 1622. The antennas are configured to generate an output that varies with the distance between the first sensor 1614 and the first fixed conductive plate 1621 and the second sensor 1616 and the second fixed conductive plate 1622. The distance between the antenna and the conductive surface changes due to deflection of the spring plate 1612 in response to loading of the hoist, which in turn varies the distance between the sensors 1614, 1616 and the fixed conductive plates 1621, 1622. In one embodiment, the electrical output of the sensors 1614, 1616 is proportional to the distance between the fixed conductive plates 1621, 1622 and the antenna. In one embodiment, the sensors 1614, 1616 are electrically coupled to a sensor circuit 1618. The sensor circuit 1618 may include a tank circuit configured to determine a change in inductance and/or impedance detected by the antennas due to the deflection of the spring plate 1612.

As shown in FIGS. 17A-17D, two sensors are located on the load sensing assembly 1608. The sensors 1614, 1616 are shown to be located mechanically opposite of each other and configured to measure a distance to different fixed conductive plates (e.g. fixed conductive plates 1621, 1622), thereby creating a differential output to the sensor circuit 1618. By creating a differential output, a temperature indifferent measurement system is provided. Additionally, a controller, such as controller 506 described above, is configured to perform software checks on each of the sensors 1614, 1616 to ensure that each of the sensors 1614, 1616 are operating within their required specifications. In some embodiments, the load sensing assembly 1608 is separate from and implemented independently of the hoist system 1600 (e.g., as a standalone force detection sensor).

Figure 18:
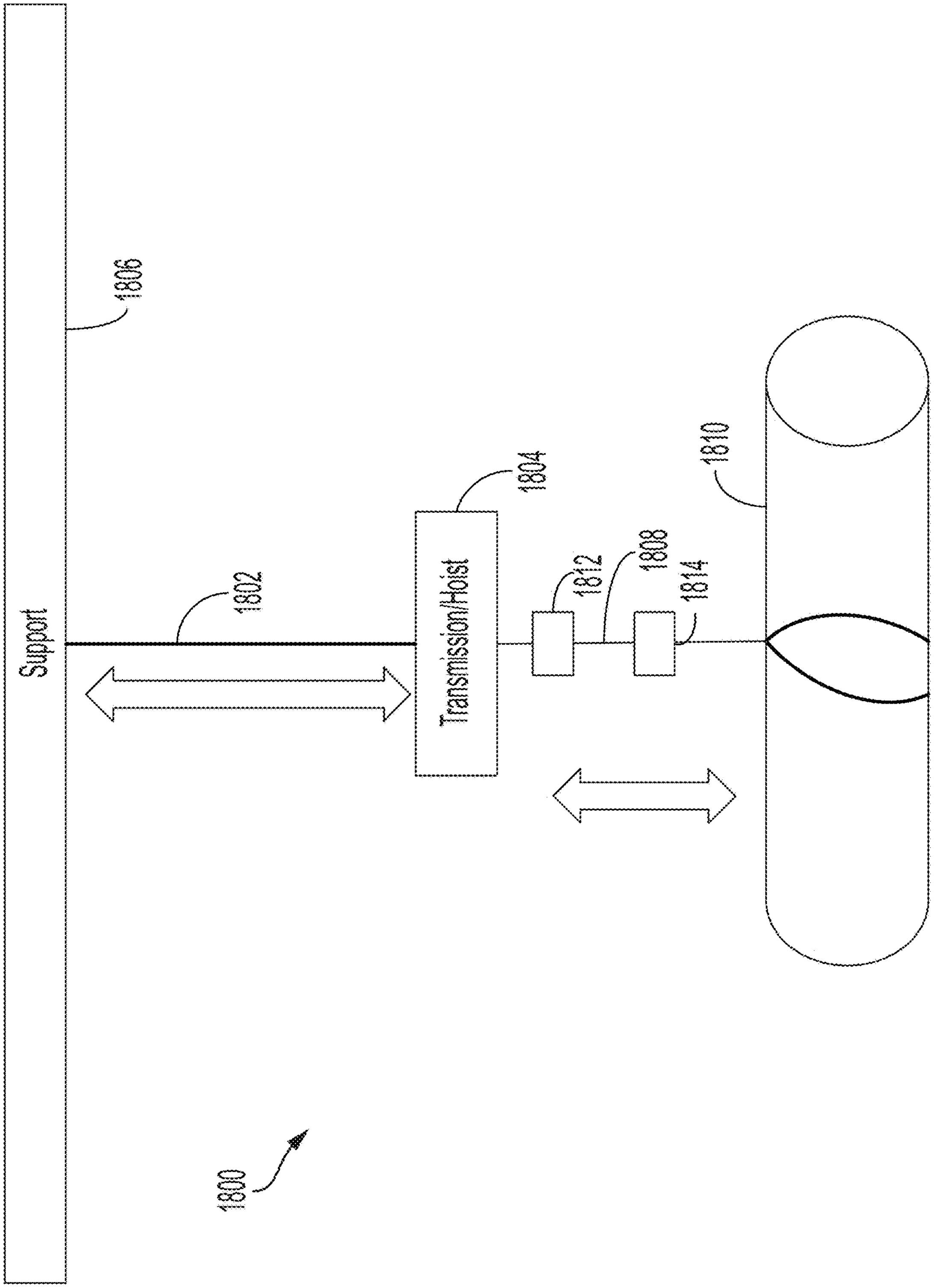
FIG. 18 illustrates a hoist system with series connected load sensors, according to some embodiments.

With reference to FIG. 18, a hoist system 1800 is shown, similar to hoist system 100 above. The hoist system 1800 has a main cable 1802 connected between a hoist 1804 and a support 1806. The cable 1802 may be constructed of different materials, such as wire cables, rope, chain, hybrid (e.g. rope covered wire cables), and the like. In some embodiments, the hoist 1804 is configured to interface with the cable 1802 to move the hoist in a longitudinal direction (i.e. up or down) along the cable 1802.

The hoist 1804 is further coupled to a load cable 1808, which couples the hoist to a load 1810. Similar to the cable 1802, the load cable 1808 may be a wire cable, a rope, a chain, a hybrid, and the like. The hoist 1804 is configured to extend or retract the load cable 1808 in order to move the load 1810 in a longitudinal direction (e.g. up or down) along the load cable 1808. In some embodiments, the hoist 1804 includes an electric motor to extend or retract the load cable 1808. However, in other examples, mechanical winches or other mechanisms may be used.

The hoist system 1800 further includes a first load sensor 1812, and a second load sensor 1814. As shown in FIG. 18, the first load sensor 1812 and the second load sensor 1814 are connected in series. In one embodiment, the first load sensor 1812 has a higher maximum weight limit than the second load sensor 1814. By coupling the load sensors 1812, 1814 in series, the second load sensor 1814 with the lower maximum weight limit can provide an input to a controller for lighter loads, and have an inherently greater sensitivity than the first load sensor 1812 with the higher maximum weight limit. Where the load 1810 is increased beyond the maximum limit of the second load sensor 1814, the second load sensor 1814 will reach its limit, and the first load sensor 1812 will provide a load measurement to a controller of the hoist system 1800 due to the higher maximum weight limit of the first load sensor 1812. This allows for the hoist system 1800 to accommodate a variety of loads, without the need for using different hoists.

Figure 19:
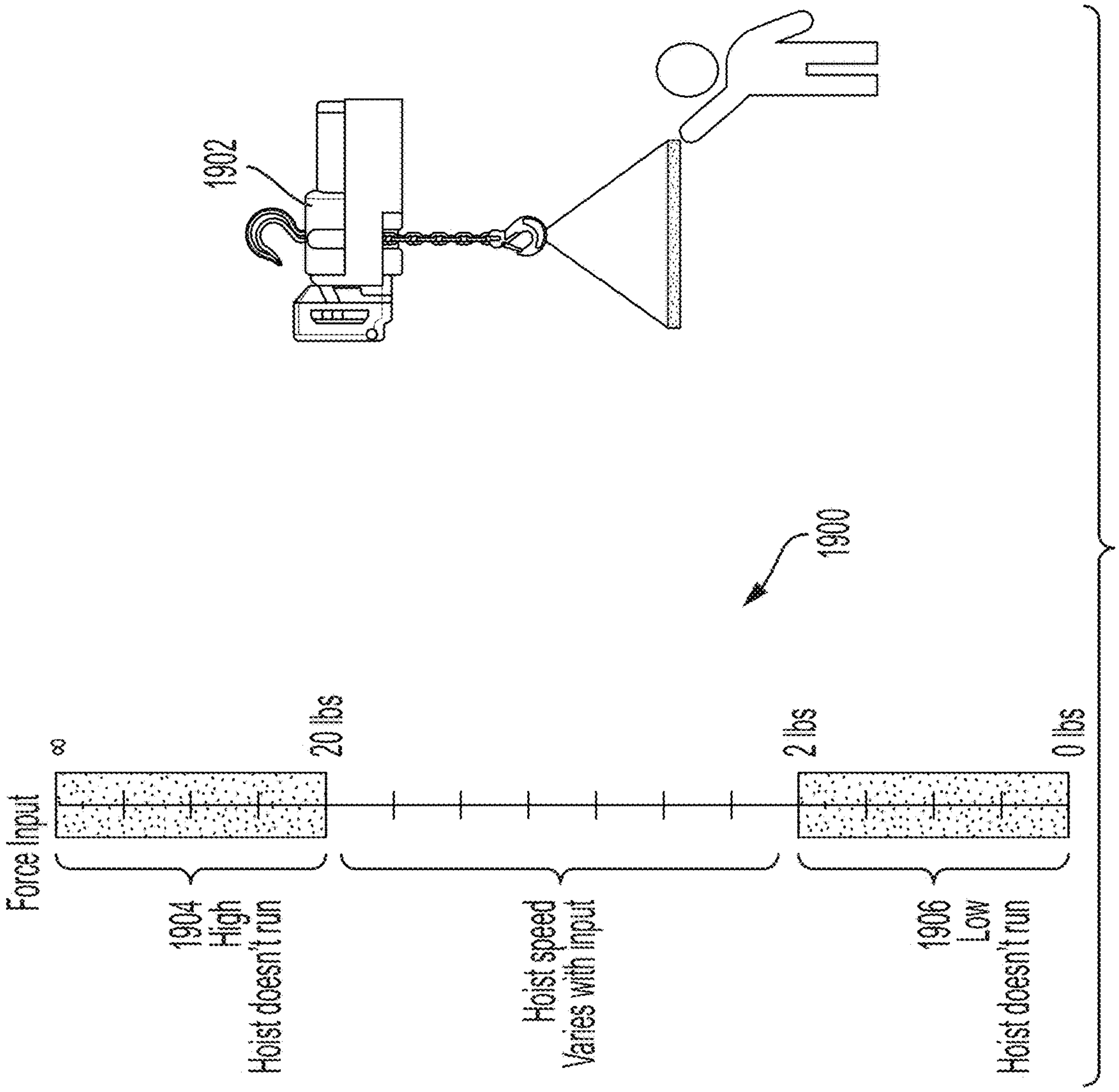
FIG. 19 illustrates a load change detection system, according to some embodiments.

FIG. 19 illustrates a load change detection system 1900, according to some embodiments. The load change detection system 1900 may be used to prevent unwanted operation of a hoist 1902, when operating in FLOAT mode, as described above. It is understood that the hoist 1902 may be any of the hoist systems described herein. In some embodiments, the hoist 1902 continuously monitors the input force applied to the load.

In one example, as described above, in a FLOAT mode, the hoist may be controlled based on changes in the load, such as by a user manually applying a force to the load, in order to raise or lower the load using the hoist system. The load change detection system 1900 is configured to only allow for the load to move in a FLOAT mode when the change in load is within a certain range of values. As shown in FIG. 19, the hoist 1902 may only operate in FLOAT mode when the change to the load is between two pounds and twenty pounds. However, values of more than two pounds or less than two pounds, and/or more than twenty pounds or less than twenty pounds are also contemplated.

By only permitting operation of the hoist 1902 in a FLOAT mode when the change in load is within the predetermined range, the occurrence of unintended operations during float mode may be reduced. For example, if an object were to fall and come into contact with the load while the hoist 1902 is in the FLOAT mode, the load change detection system 1900 would prevent the object from causing the load to be lowered where the weight of the object is above a maximum force value 1904, such as those described above. Similarly, by having a minimum force value 1906, the hoist 1902 will not operate when the change in the load is below the minimum force value 1906. This may be useful where a user places a tool or other object on the load during operation. Provided the object weighs less than the minimum force value, the hoist 1902 will not allow the load to move when in a FLOAT operation.

In other embodiments, the hoist 1902 may further monitor the load for any sudden changes in the force input that may indicate an impact to the load. If the force increases or decreases too rapidly (e.g. exceeds predetermined thresholds), the hoist 1902 ceases operation to prevent movement of the load.

Figure 20:
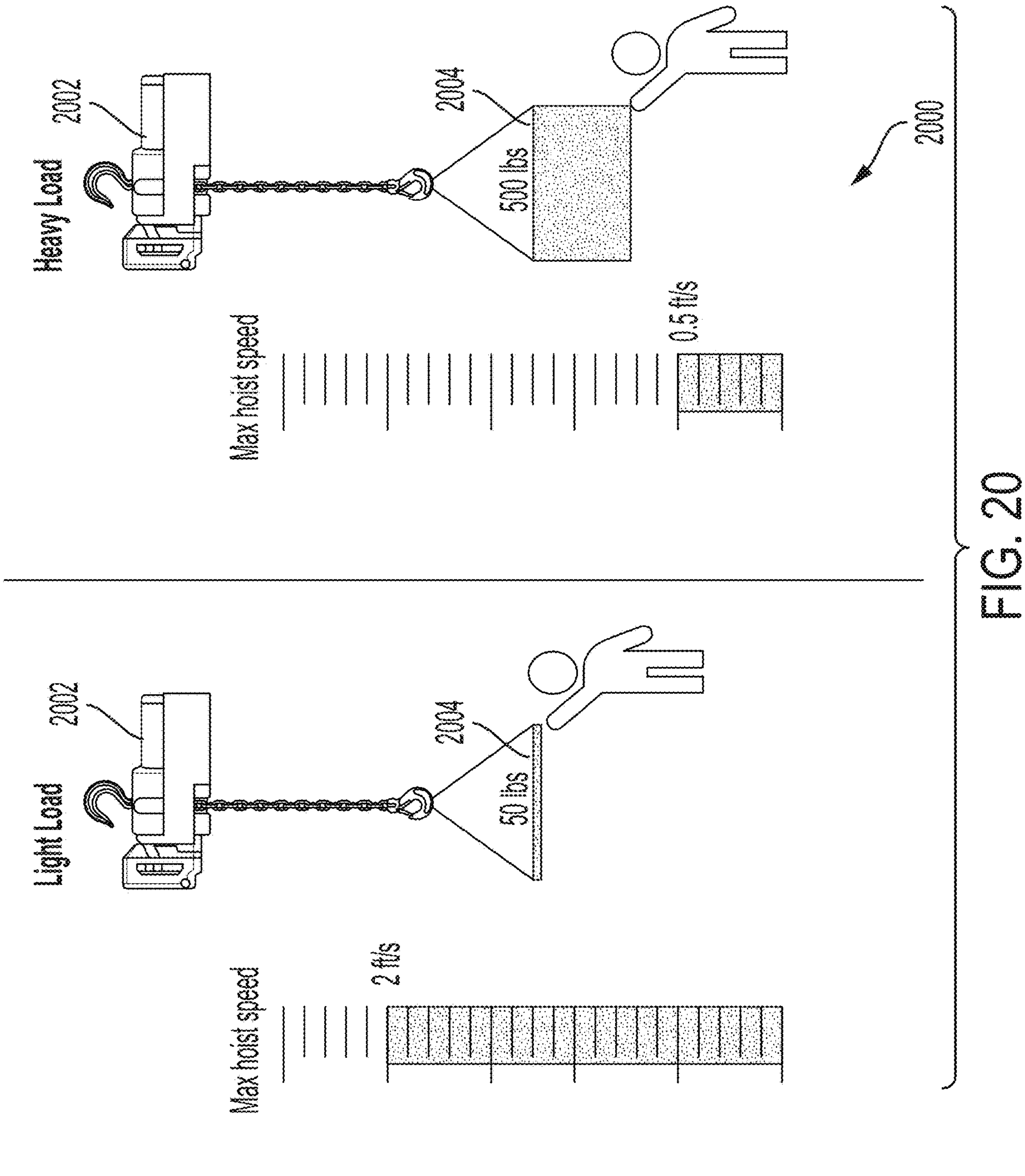
FIG. 20 illustrates a dynamic scaling system for use with a hoist device, according to some embodiments.

FIG. 20 shows a dynamic scaling system 2000 with use with a zero-gravity hoist system, such as those described herein. The dynamic scaling system 2000 is configured to control the response to a user input where a hoist 2002 is operating in a FLOAT mode. The hoist 2002 may constantly monitor a load coupled to the hoist system. In response to determining that a heavier load 2004 is placed on the hoist 2002, the maximum speed and acceleration is limited to avoid sudden operational changes, and to help a user maintain control. For example, the hoist 2002 may reduce the maximum operating speed of the hoist 2002 to 0.5 ft/s in response to detecting a heavy load, such as 500 lbs. Similarly, when a lighter load 2004 is coupled to the hoist 2002, the maximum operating speed may be increased. For example, the hoist 2002 may increase the max speed to 2 ft/s in response to detecting a lighter load, such as 50 lbs. Thus, if a user applies the same force (e.g. 101*bs*) to a 50 lb load and a 500 lb load, the heavier load will not move as quickly as the 50 lb load, with the same force applied.

The above loading and speed values are for example purposes only, and it is contemplated that the hoist system can constantly update the maximum operating speed based on a detected load.

Figure 21:
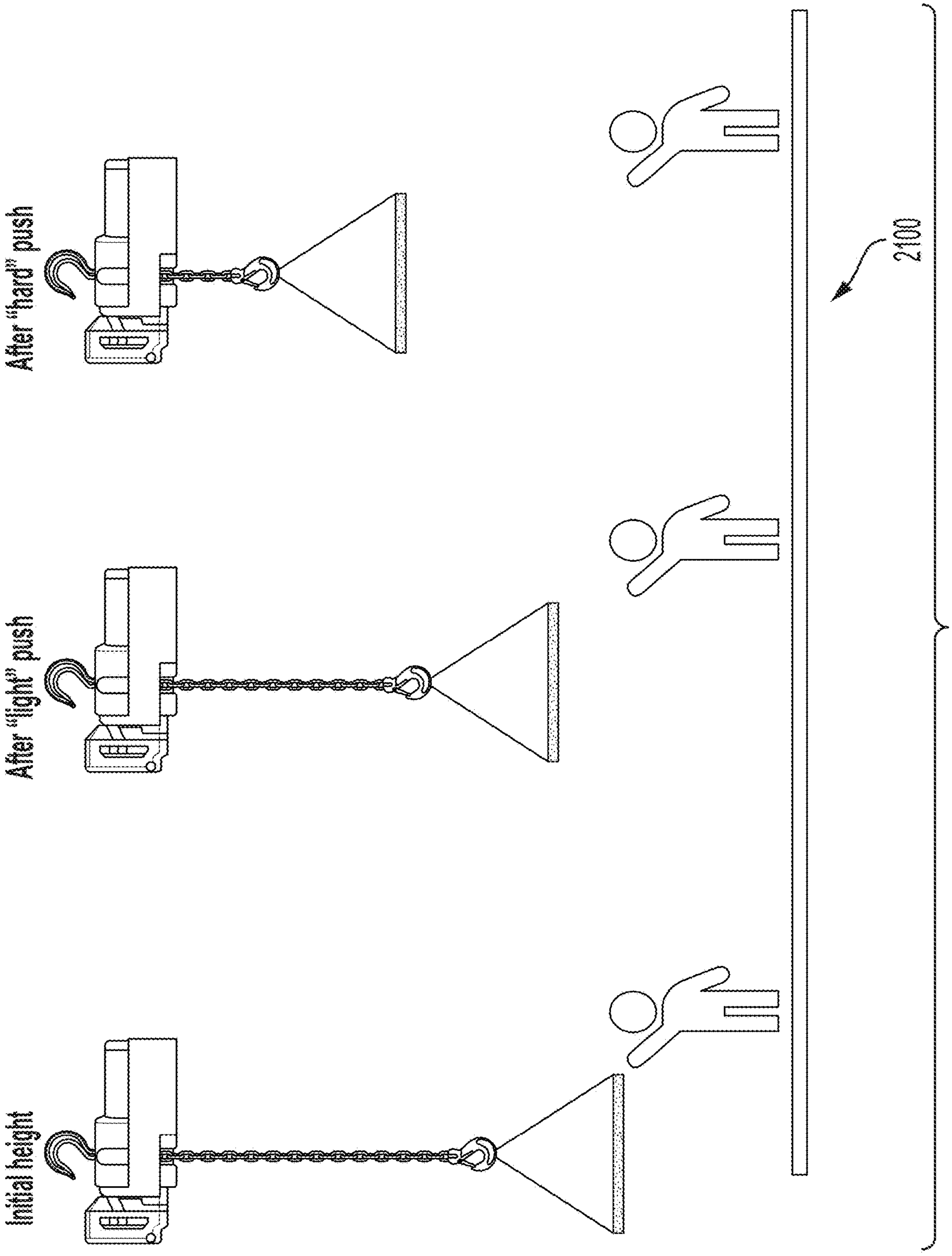
FIG. 21 illustrates a coasting mode for use with a hoist device, according to some embodiments.

FIG. 21 illustrates a coasting mode 2100, according to some embodiments. The coasting mode 2100 is configured to allow for a user to apply an upward force, or push, to a load attached to a hoist system, such as those described herein. Based on the determined amount of upward force, the load will continue to rise a predetermined amount after the user stops providing the upward force on the load. In one embodiment, the predetermined amount is a distance. In other embodiments, the predetermined amount may be a time period. The hoist system may be configured to continually monitor the force applied to the load and execute the coast mode based on the force. For example, in response to detecting a "light" application of upward force to the load, the hoist system may continue to raise the load after the force is released by a first predetermined amount. In one embodiment, the "light" application of upward force may be approximately 5 lbs of upward force. However, values of more than 5 lbs and less than 5 lbs are also contemplated. Further, the first predetermined value may be a distance such as 5 feet. However, distances of more than 5 feet or less than 5 feet are also contemplated. In other examples, the first predetermined value may be 5 seconds. However, values of more than 5 seconds and less than 5 seconds are also contemplated.

In the above example, in response to detecting a "hard" application of upward force to the load, the hoist system may continue to raise the load after the force is released by a second predetermined amount, which is greater than the first predetermined amount. In one embodiment, the "hard" application of upward force may be approximately 10 lbs of upward force. However, values of more than 10 lbs and less than 10 lbs are also contemplated. Further, the second predetermined value may be a distance such as 10 feet. However, distances of more than 10 feet or less than 10 feet are also contemplated. In other examples, the second predetermined value may be 10 seconds. However, values of more than 10 seconds and less than 10 seconds are also contemplated.

Figure 22:
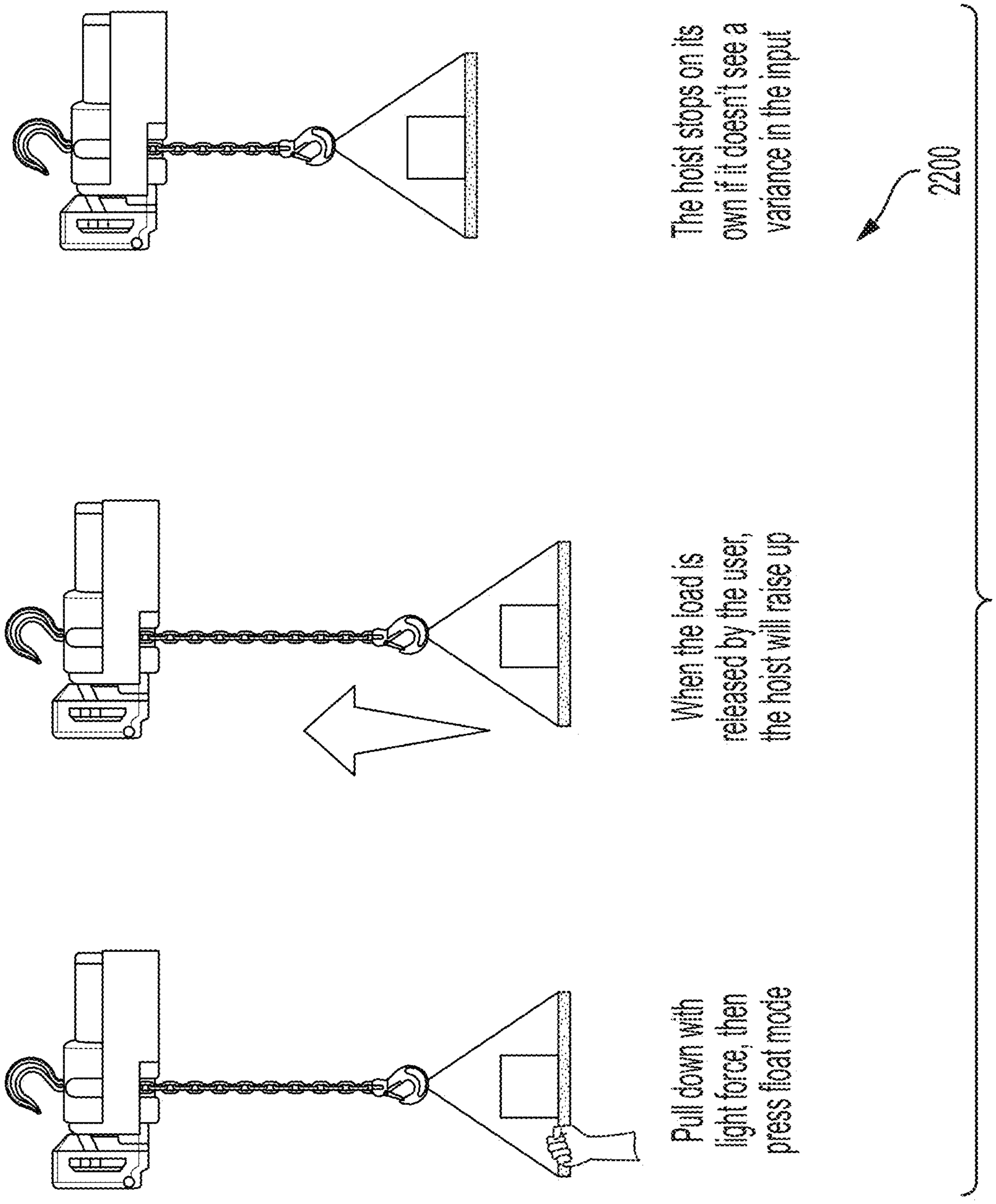
FIG. 22 illustrates a pre-loading mode for use with a hoist device, according to some embodiments.

Turning now to FIG. 22, a pre-load mode 2200 for a hoist system, such as those described herein, is described according to some embodiments. The pre-load mode 2200 is configured to allow a user to manually add a small amount of extra weight to a load. After initiating the FLOAT mode, the weight may be removed, thereby inducing the hoist system to lift the load automatically. In some embodiments, the hoist system may be configured to lift the load by a predetermined amount, such as 5 feet. However, values of more than 5 feet and less than 5 feet are also contemplated. In other examples, the hoist system may also be configured to monitor the input force associated with the load to determine when to stop the load. In response to determining that the input force (e.g. the force applied to the load by the user) remains constant, the hoist system will stop the load within a few feet. Typically, a user will apply an inconsistent force when using FLOAT mode. For example, a user may provide an input force that varies by ±1 lb. However, this variation may be more or less than 1 lb in some examples. Accordingly, a constant input force is likely not user provided, and may indicate a runaway condition. Thus, the hoist system may stop movement of the load when the input force is determined to be constant over a period of time. For example, the period of time may be 2 seconds. However, values of more than 2 seconds, or less than 2 seconds are also contemplated.

Figure 23:
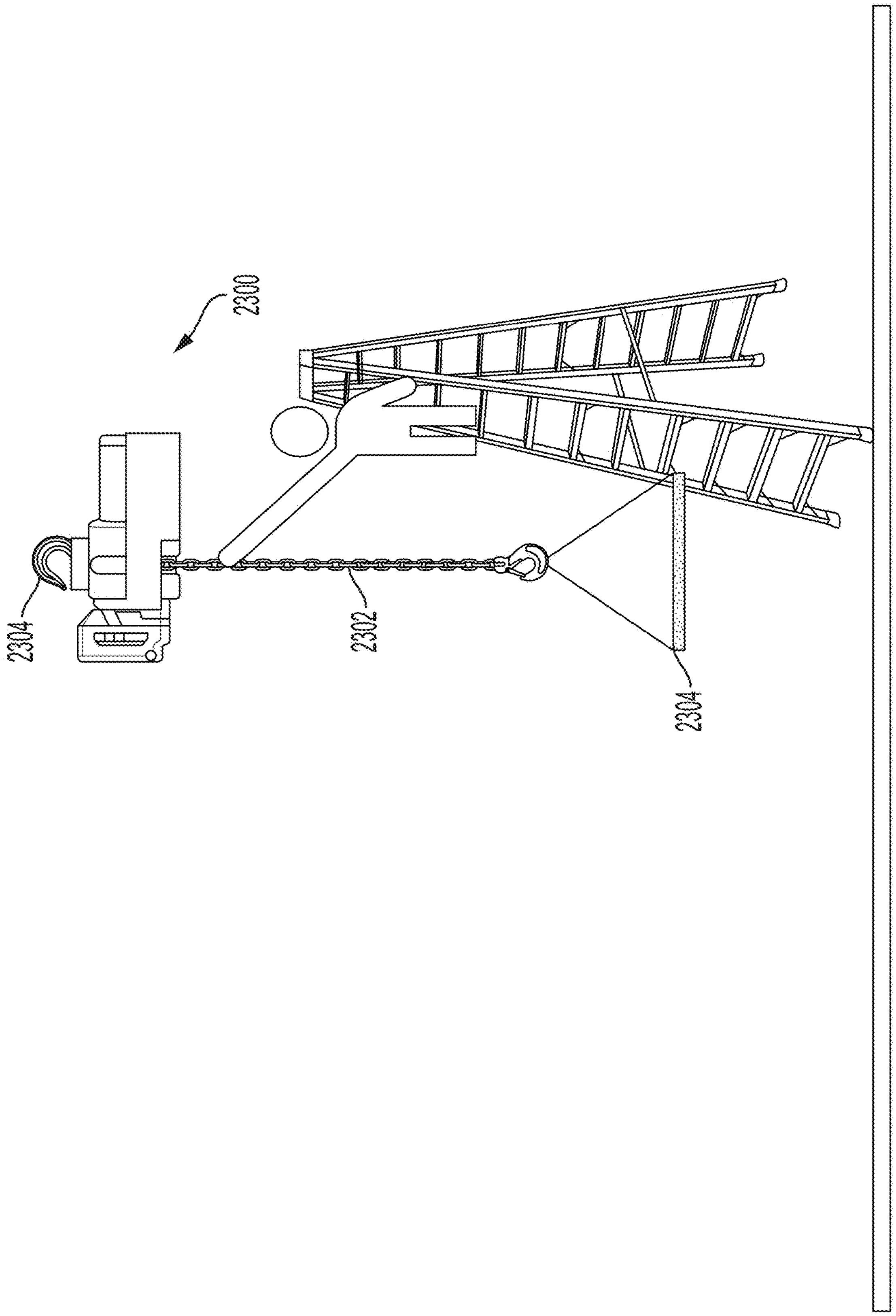
FIG. 23 illustrates a chain controlled zero-gravity hoist system, according to some embodiments.

FIG. 23 illustrates a chain controlled zero-gravity hoist system 2300, according to some embodiments. The chain-controlled hoist system 2300 may operate similarly to other systems described herein. The chain-controlled hoist system 2300 may be configured to allow a user to manipulate a load chain 2302 when operating in a FLOAT mode. This can allow the user to control a load 2303 at any height along the chain, not just at the load. This may be useful when the user is located above the load, such as when installing a load into a restricted access area. Similar to above, a load cell or similar sensor 2304 may be configured to detect the change in load between the hoist system 2300 and a support member to which the hoist system 2300 is coupled. As the user applies a force to the load chain 2302, the change in load is detected by the load cell 2304 and communicated to a controller of the hoist system 2300 to effectuate moving the load in a upward or downward direction, based on the detected change in applied force.

Figure 24:
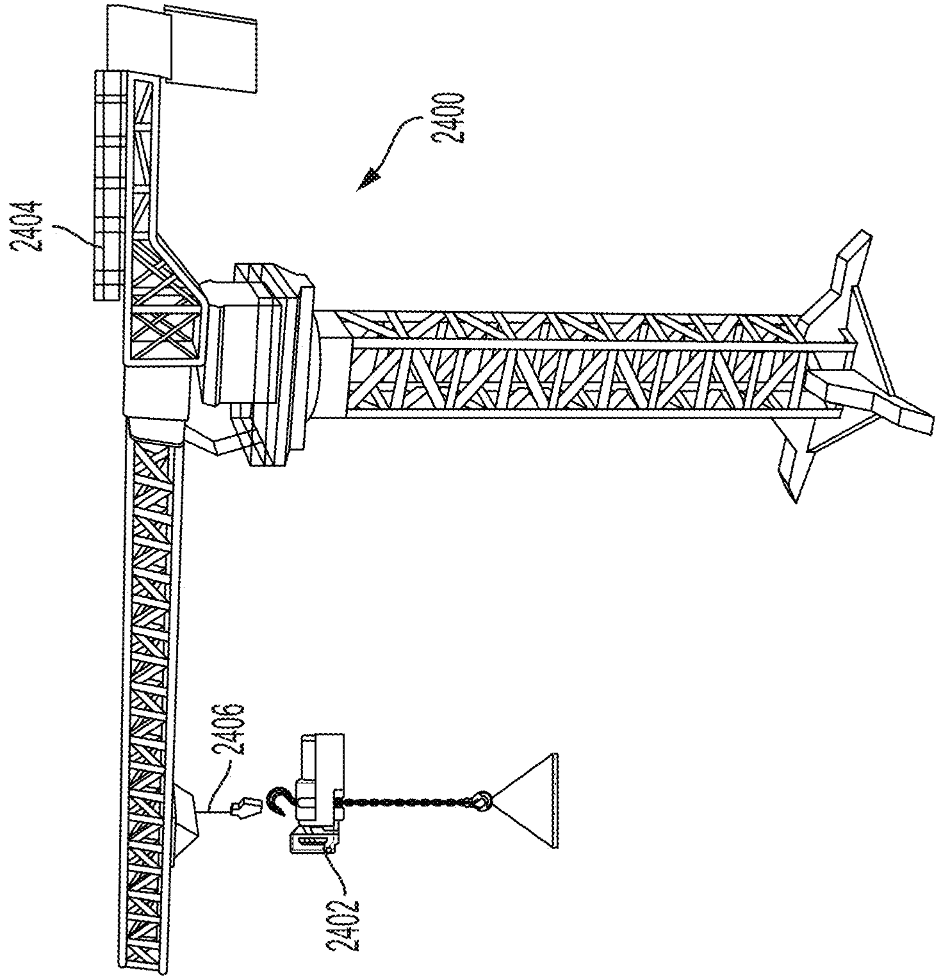
FIG. 24 illustrates a crane mounted hoist system, according to some embodiments.

Turning now to FIG. 24, a crane mounted hoist system 2400 is described, according to some embodiments. The hoist system 2400 may be similar to the zero-gravity hoist systems described herein. A hoist device 2402 is attached to a crane 2404 via a lifting device 2406 associated with the crane 2404. By attaching the hoist device 2402 to the crane 2404, a user on the ground can finely control a load using the FLOAT mode on the hoist device 2402. This can allow the crane to control macro movements of the load, while the user can use the FLOAT mode of the hoist device 2402 to control the micro movements of the load. This can improve coordination with the crane operator, as the user on the ground and the crane operator do not have to rely on radio communication to control the micro movements of the load.

Figure 25A:
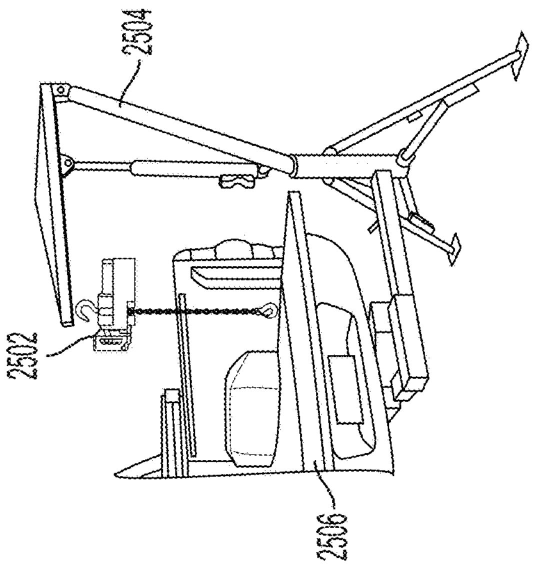
FIGS. 25A-25C illustrate various implementations of zero-gravity hoist system, according to some embodiments.
Figure 25B:
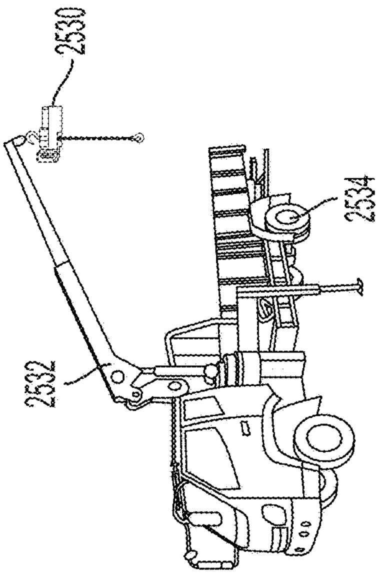
Figure 25C:
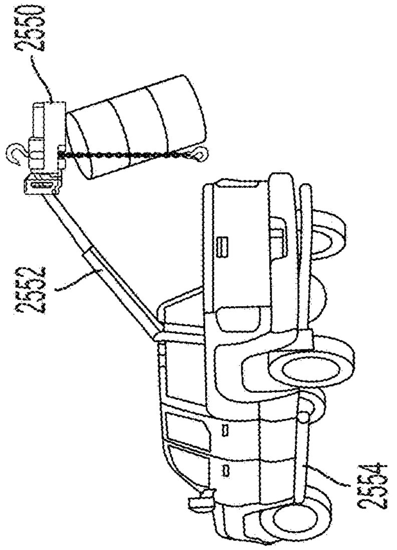

FIGS. 25A-C illustrates additional implementations for the hoist systems described herein. FIG. 25A illustrates a hoist system 2502 coupled to a ground mounted lifting system 2504 for loading/unloading cargo from a bed of a truck 2506. FIG. 25B illustrates a hoist system 2530 coupled to a crane 2532 mounted in the bed of a flatbed truck 2534 for loading/unloading cargo from the bed of the flatbed truck 2534. FIG. 25C illustrates a hoist system 2550 coupled to a crane 2552 mounted in a bed of a pickup truck 2554 for loading/unloading cargo from the bed of the pickup truck 2554. It is contemplated that the host systems 2502, 2530, 2550 are similar to the hoist systems described herein.

Figure 26:
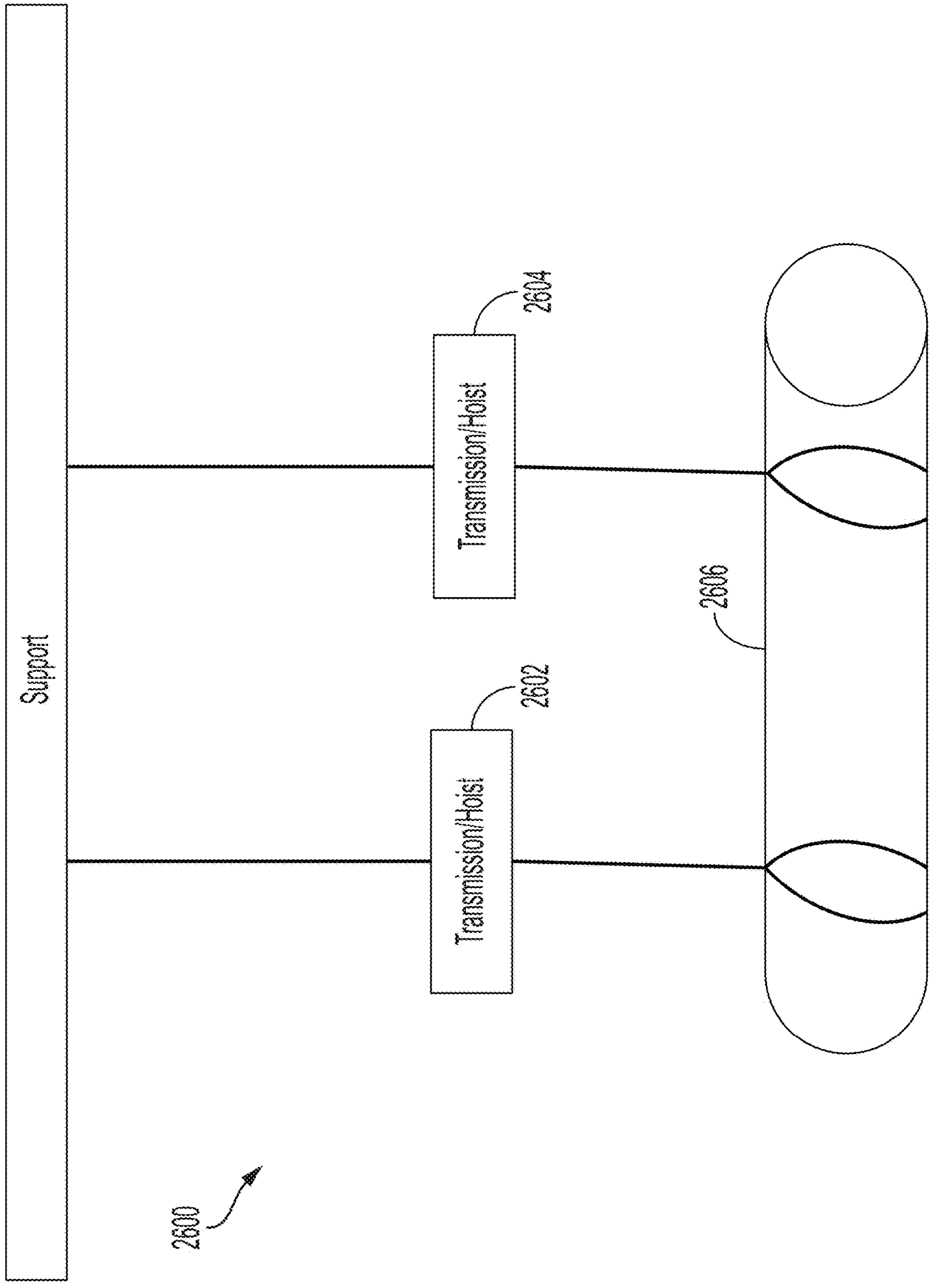
FIG. 26 illustrates a multi-hoist system, according to some embodiments.

FIG. 26 illustrates an example multi-hoist system 2600. The hoist system 2600 includes a first hoist device 2602 and a second hoist device 2604. The first hoist device 2602 and the second hoist device 2604 may be similar to the hoist devices described herein. Additionally, the first hoist device 2602 and the second hoist device 2604 may be coupled to a support and a load as described above. The first hoist device 2602 and the second hoist device 2604 are coupled to a load 2606. In one embodiment, the hoist devices 2602, 2604 are electronically coupled to synchronize the control of the hoist devices 2602, 2604. In one example, both hoist devices 2602, 2604 may include a FLOAT mode as described above, thereby allowing a user to control the load by applying an upward or downward force on the load 2606. By using two hoist devices 2602, 2604, better balance and control of a load 2606 may be achieved during lifting of the load 2606. Additionally, by using two hoist devices 2602, 2604, heavier loads may be lifted. While the above embodiment of FIG. 26 illustrates two hoist devices coupled to the load 2606, it is contemplated that three or more hoist devices could be coupled to a load to achieve a lifting operation.

Figure 27A:
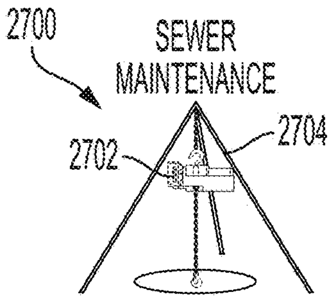
FIGS. 27A-27C illustrate various applications of zero-gravity hoist systems, according to some embodiments.
Figure 27B:
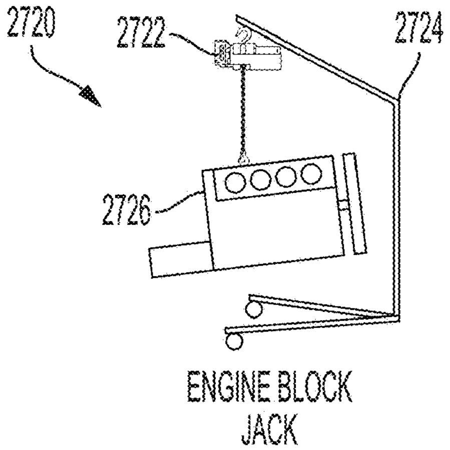
Figure 27C:
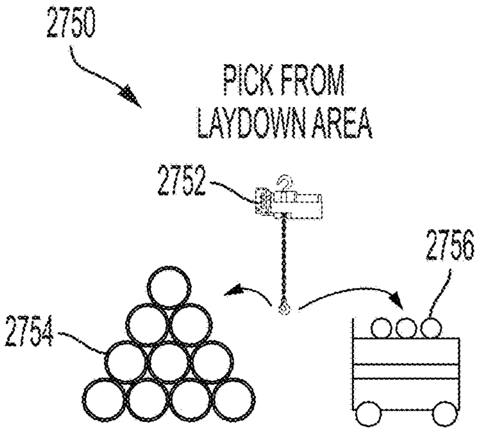

FIGS. 27A-27C illustrate possible applications of zero-gravity hoist devices, such as those described above. FIG. 27A illustrates a tripod mounted hoist system 2700 including a hoist device 2702 coupled to a tripod 2704. For example, the tripod 2704 may be positioned over a manhole to allow for a load to be lifted into and out of the manhole. However, the tripod mounted hoist system 2700 may be positioned over various loads or in other environments to allow for various loads to be lifted.

FIG. 27B illustrates a portable hoist stand mounted hoist system 2720. The system 2720 includes a hoist device 2722 coupled to a portable hoist stand 2724. The hoist device 2722 may be a hoist device as described herein. The portable hoist stand 2724 may be a hoist stand configured to facilitate the lifting, suspending, and lowering of an engine block 2726. For example, the portable hoist stand may include one or more wheels for being maneuvered, as well as a telescoping arm to allow for positioning of the hoist device 2722 over a load. While the portable hoist stand mounted hoist system 2720 is described as being used to lift an engine block 2726, it is contemplated that the system 2720 could be configured to lift other loads.

FIG. 27C illustrates a laydown area hoist system 2750, according to some embodiments. The laydown area hoist system 2750 includes a hoist device 2752, configured to facilitate moving various loads 2754 to and from a loading vehicle 2756. Example loads may include stones, scrap metal, waste (e.g. garbage), or other applicable loads.

Other applications for a hoist system as described herein may include: holding a structure during demolition; removing demolition waste; hoisting commercial or personal components during maintenance; lifting construction components at a worksite; or other applications. It should be understood that the implementations and applications described herein are exemplary and should not be construed as limiting.

Figure 28A:
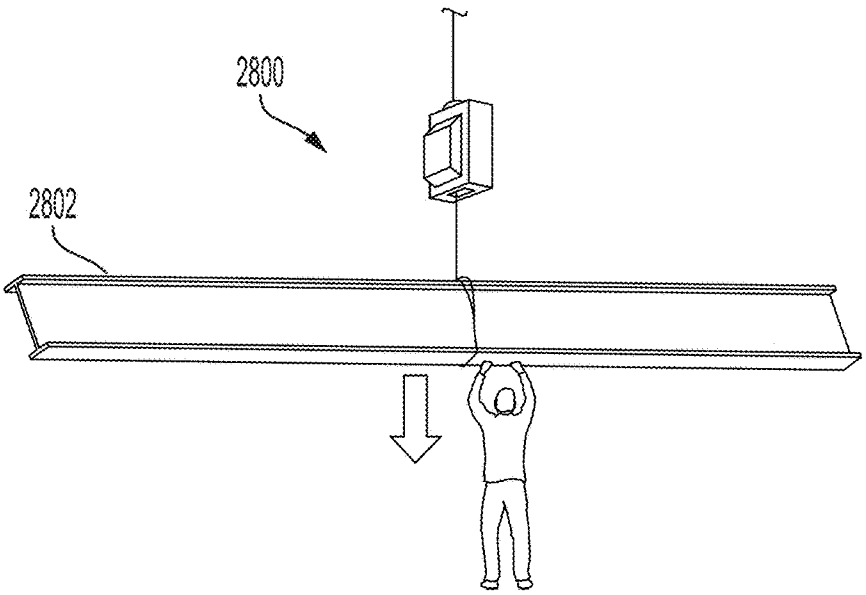
FIGS. 28A and 28B illustrate single user operation of a zero-gravity hoist system, according to some embodiments.
Figure 28B:
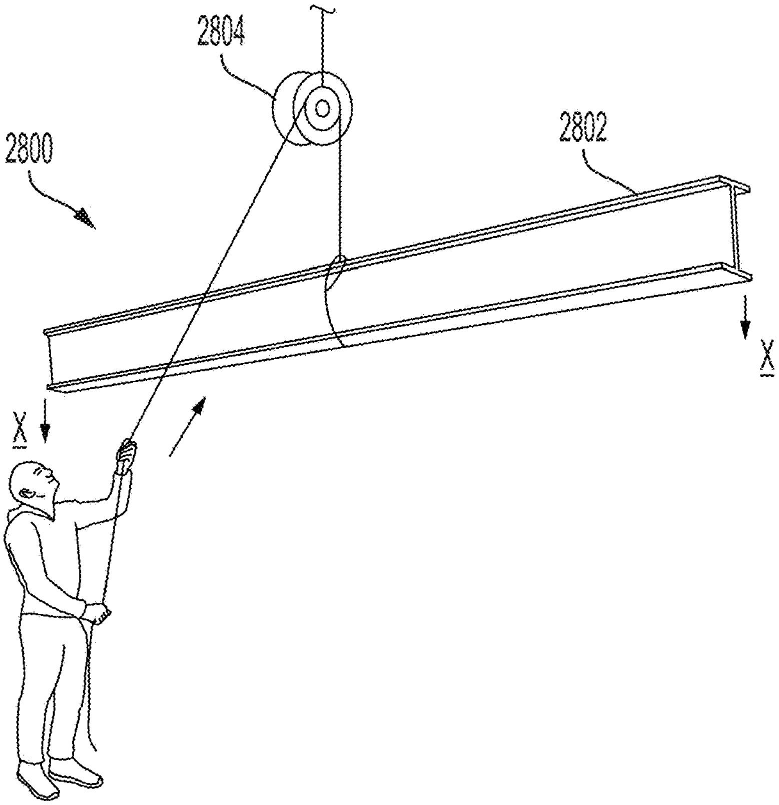

FIGS. 28A and 28B illustrate single user operation of a zero-gravity hoist system 2800 for placing an object in place (e.g., while constructing a building. The user can control the location of the object by physically touching the load 2802 as shown in FIG. 28A, or from the ground by controlling a pully 2804, as shown in FIG. 28B.

Figure 29A:
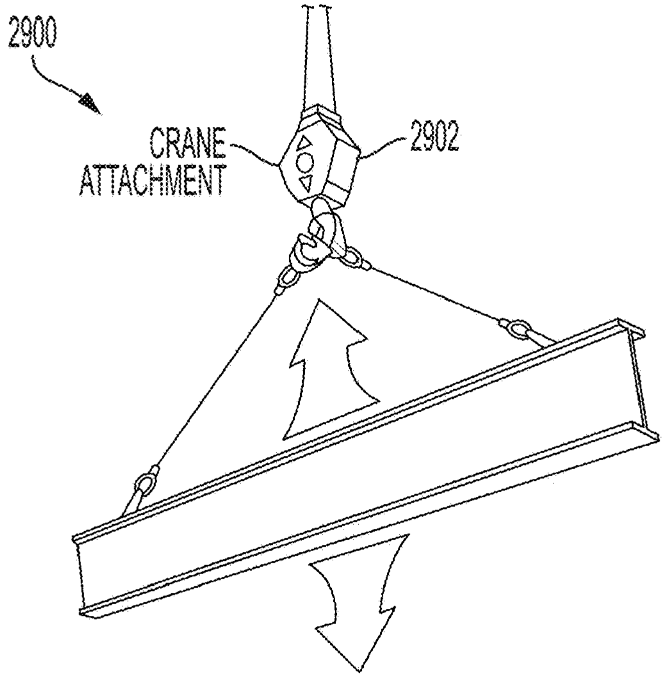
FIGS. 29A and 29B illustrate a crane attachment for a zero-gravity hoist system, according to some embodiments.
Figure 29B:
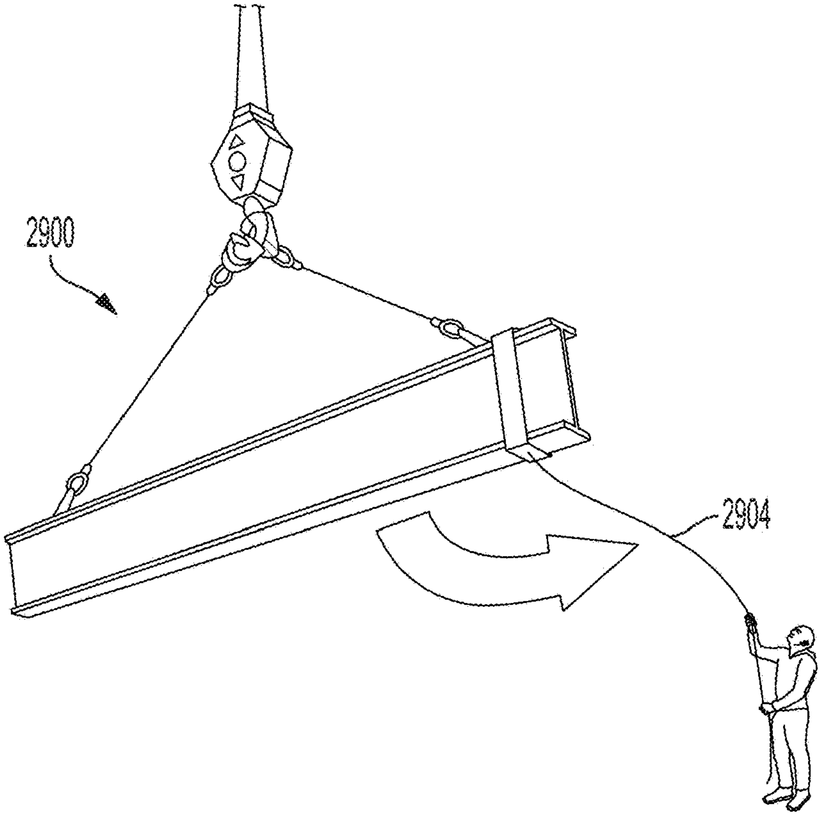

FIGS. 29A and 29B illustrate a zero-gravity hoist crane attachment. The zero-gravity hoist crane attachment allows for a single user to control the lifting and movement of large items (e.g., I-beams). FIG. 29A illustrates only a zero-gravity hoist crane attachment 2902 for raising or lowering an object. FIG. 29B illustrates an attachment 2904 connected to an object being lifted by a zero-gravity hoist crane attachment that allows a user to also control the direction, rotation, and tilt of the object.

Figure 30A:
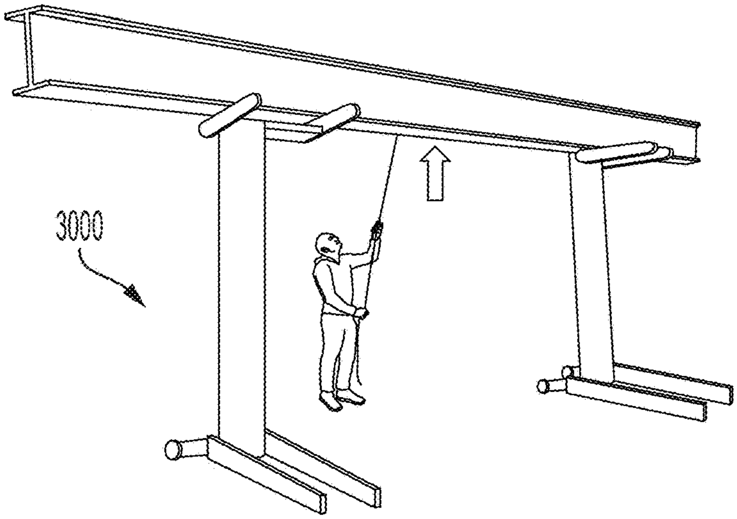
FIGS. 30A-30C illustrate rigid lift implementations of a zero-gravity hoist system, according to some embodiments.
Figure 30B:
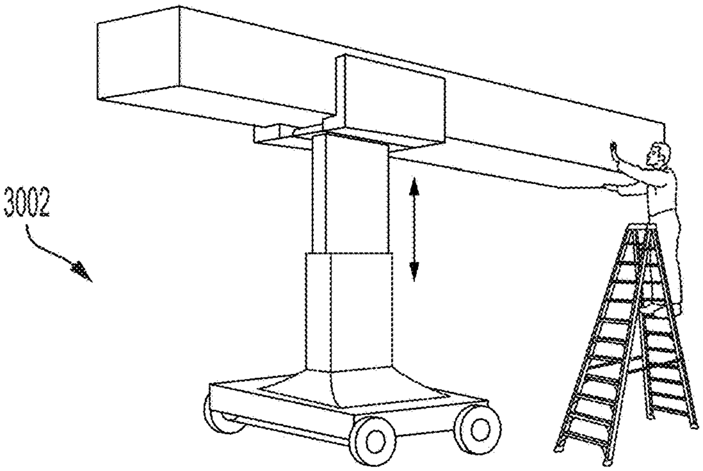
Figure 30C:
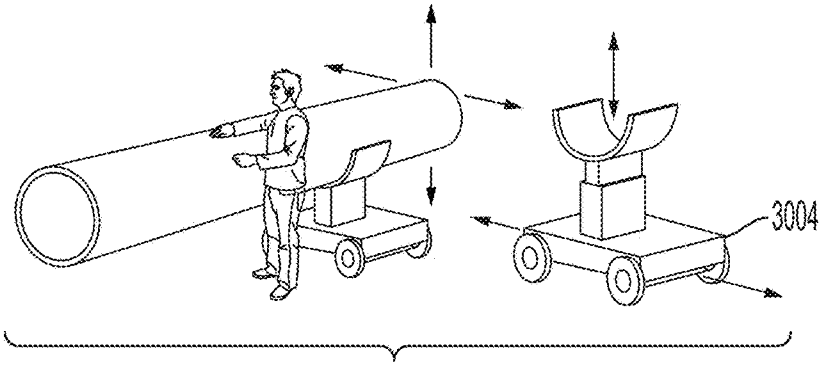

FIGS. 30A, 30B, and 30C illustrate rigid zero-gravity lift platforms including dedicated material interfaces. FIG. 30A illustrates a dual rigid zero-gravity lift platforms 3000 that can be controlled together to raise an object. FIG. 30B illustrates a rigid zero-gravity lift platform 3002 that includes an interface (e.g., rectangular-shaped interface) configured to receive a particular object to be raised (e.g., a steel beam). FIG. 30C illustrates a mobile rigid zero-gravity lift platform 3004 that includes an interface (e.g., a round interface) configured to receive a particular object to be raised (e.g., a pipe).

Figure 31A:
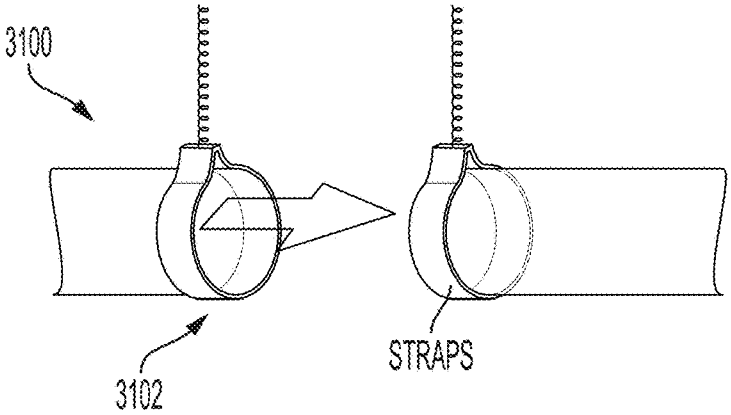
FIGS. 31A-31C illustrate zero-gravity hoist implementations for joining two conduits, according to some embodiments.
Figure 31B:
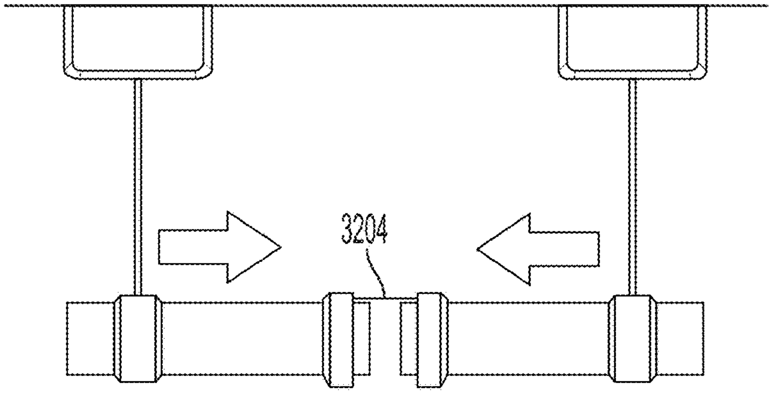
Figure 31C:
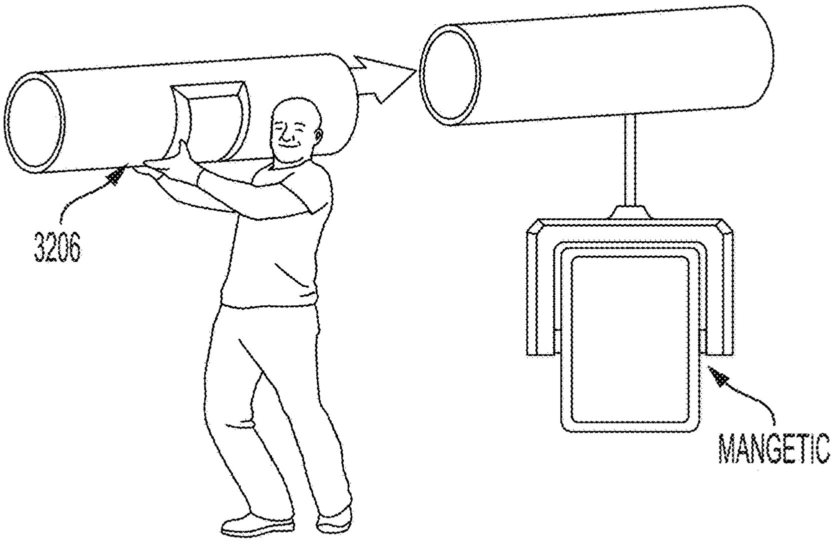

FIGS. 31A, 31B, and 31C illustrate zero-gravity hoist implementations for joining two conduits. FIG. 31A illustrates two conduits with zero-gravity hoist come-a-long attachments 3102 for precisely positioning the two conduits for attachment. FIG. 31B illustrates a zero-gravity hoist system 3104 including two attachments on the end of conduits for sleeving the conduits together. FIG. 31C illustrates a magnetic attachment device 3106 for use with a zero-gravity hoist system to assist in positioning a conduit in position for installation.

Figure 32B:
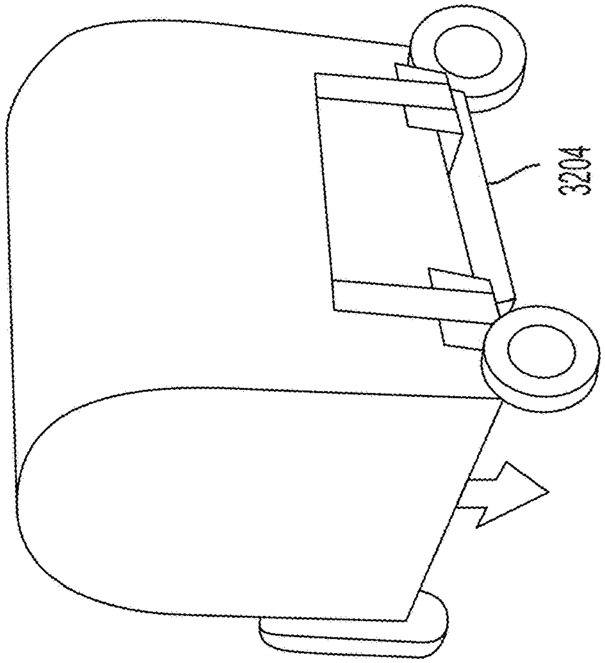
FIGS. 32A and 32B illustrate top-down and bottom-up structures including zero-gravity hoist, according to some embodiments.
Figure 32A:
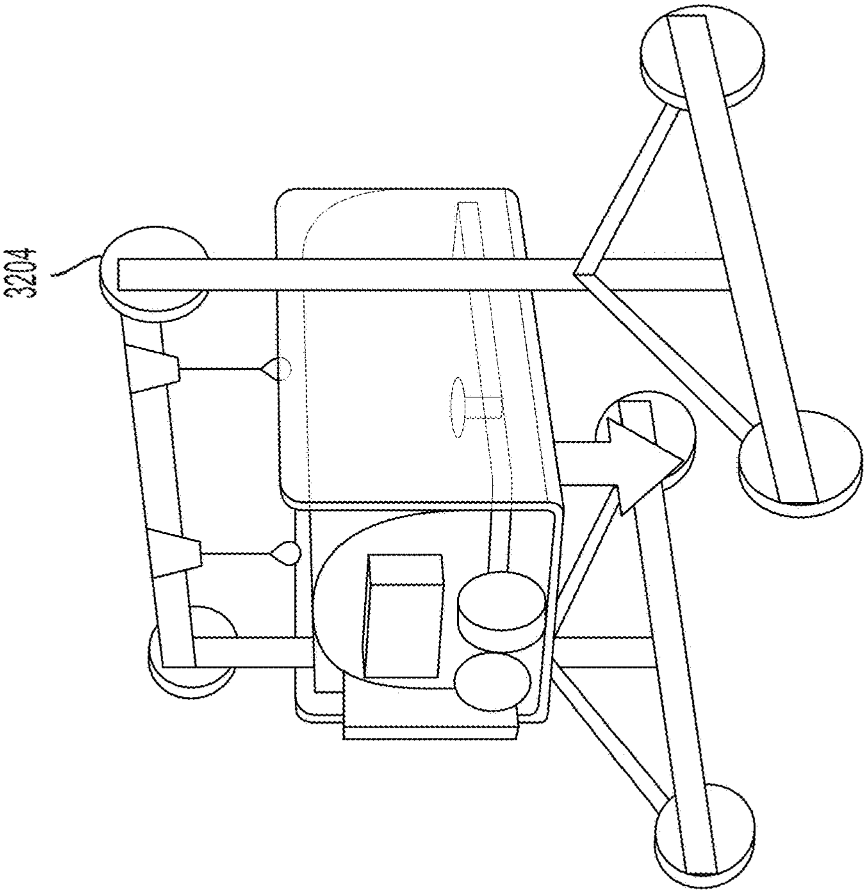

FIGS. 32A and 32B illustrate top-down and bottom-up structures including zero-gravity hoist. FIG. 32A illustrates a top-down (suspension) structure 3200 for raising and lowering an object using a zero-gravity hoist system. FIG. 32B illustrates a bottom-up structure 3202 for receiving and object and raising the object up.

Figure 33B:
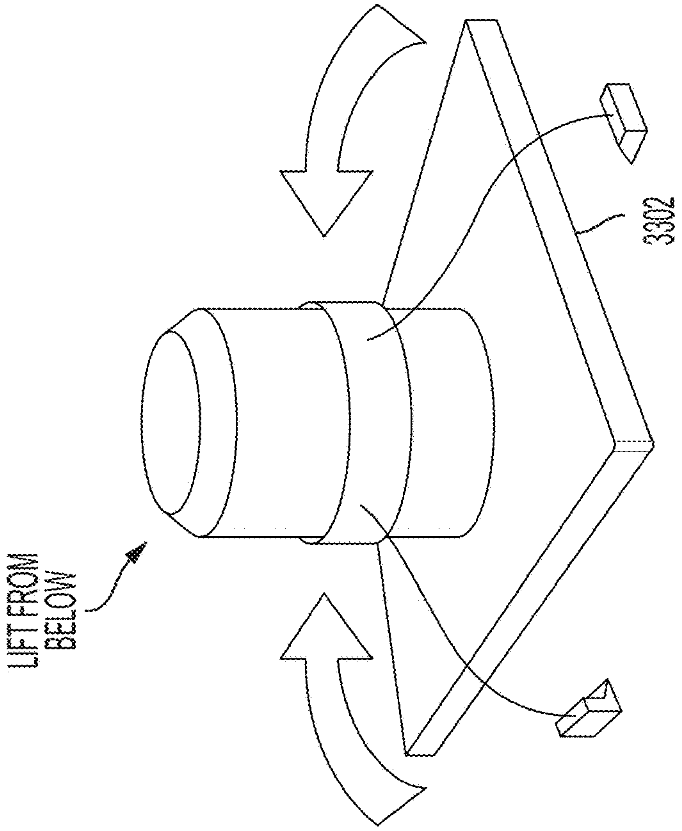
FIGS. 33A and 33B illustrate ground-up zero-gravity hoist implementations, according to some embodiments.
Figure 33A:
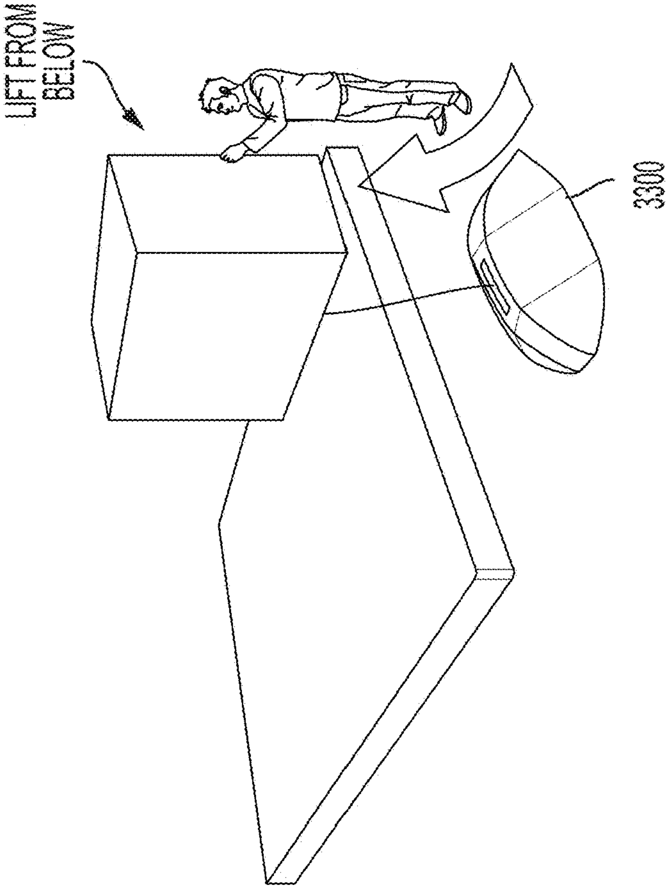

FIGS. 33A and 33B illustrate ground-up zero-gravity hoist implementations. FIG. 33A illustrates a zero-gravity hoist system 3300 for lifting an object from the ground up (e.g., to place on a different surface). The zero-gravity hoist device can be placed under or around an object and then used to raise the object. FIG. 33B illustrates a similar zero-gravity hoist device 3302 that fits around and object for raising the object.

Figure 34A:
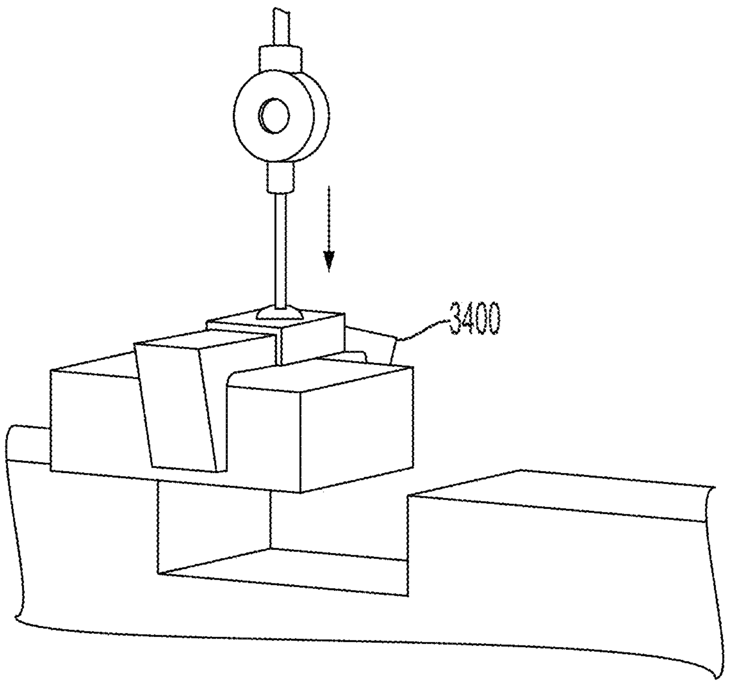
FIGS. 34A-34C illustrate rigid attachment mechanisms for a zero-gravity hoist system, according to some embodiments.
Figure 34B:
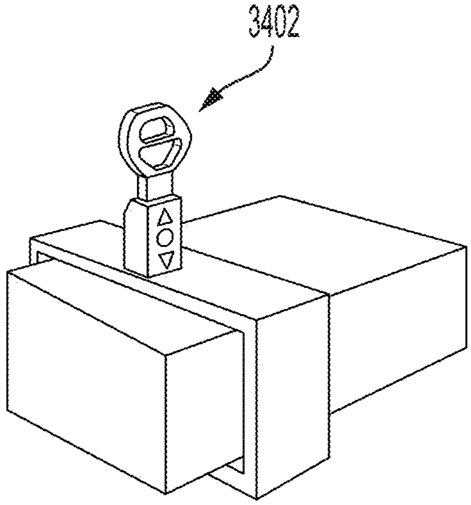
Figure 34C:
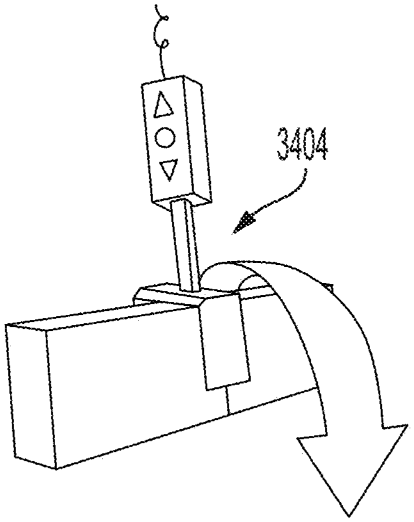

FIGS. 34A, 34B, and 34C illustrate rigid attachment mechanisms for a zero-gravity hoist system. FIG. 34A illustrates a claw 3400 for grasping an object and then raising and transporting the object (e.g., along a conveyor line that moves the claw). FIG. 34B illustrates a handheld attachment 3402 that attaches to a device to be raised. Once the attachment 3402 is attached to the object, the attachment 3402 is connected to a lifting mechanism of a zero-gravity hoist system. FIG. 34C illustrates a handheld maneuverable device 3404 of a zero-gravity hoist system for picking an object from a pile and moving it to its final location.

Figure 35A:
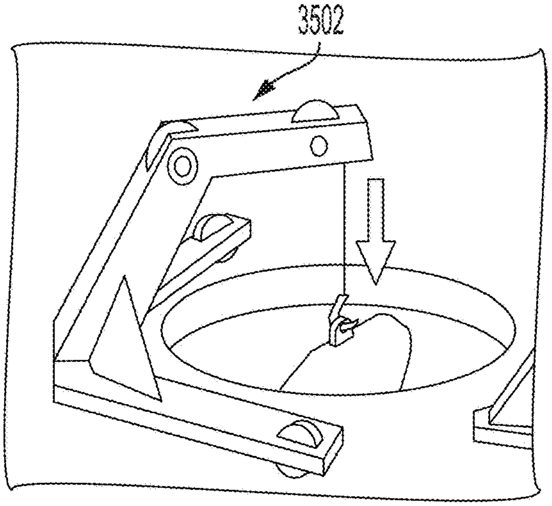
FIGS. 35A-35C illustrate down-hole implementations of a zero-gravity hoist system, according to some embodiments.
Figure 35B:
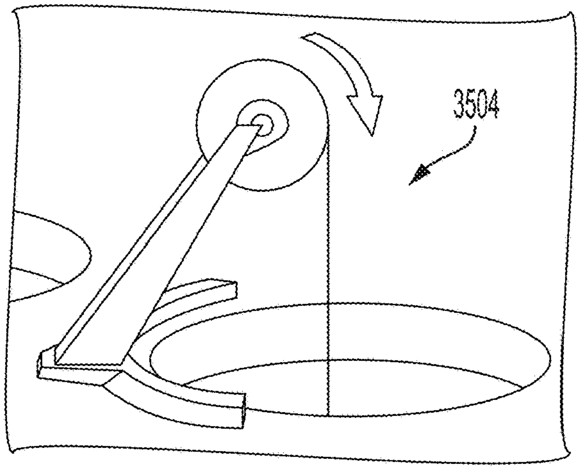
Figure 35C:
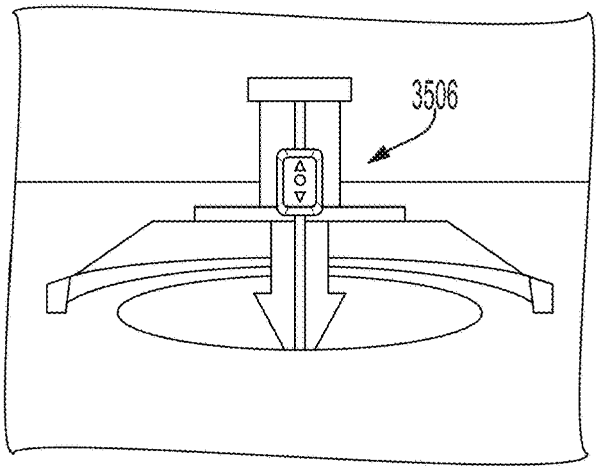

FIGS. 35A, 35B, and 35C illustrate down-hole implementations of a zero-gravity hoist system. FIG. 35A illustrates an articulating arm 3502 that allows a user to lower a material down a hole with control over the position and alignment of the material. The articulating arm is part of a tripod configuration that can be configured to lower an object (e.g., material, human being, etc.) down a hole. FIG. 35B illustrates a variation of the tripod from FIG. 35A that includes a pully system 3504 rather than an articulating arm. FIG. 35C illustrates another variation of the tripod of FIG. 35A that includes a control unit or remote 3506 that allows a user to control the lowering of an object (e.g., down a manhole). The tripods are configured to traverse the circumference of the hole (e.g., a manhole).

Figure 36B:
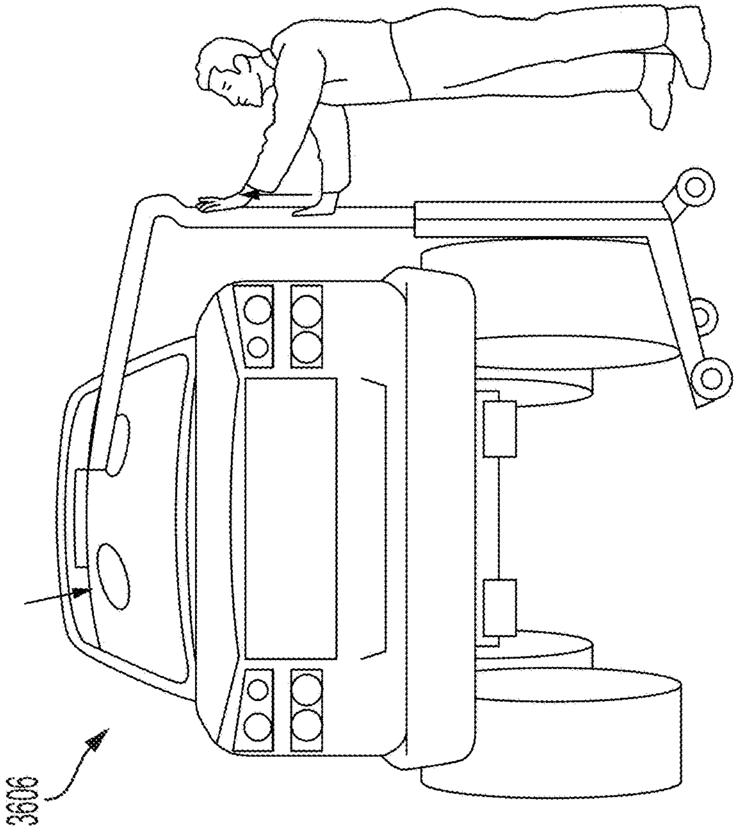
FIGS. 36A and 36B illustrate automotive lift and part replacement implementations of zero-gravity hoist, according to some embodiments.
Figure 36A:
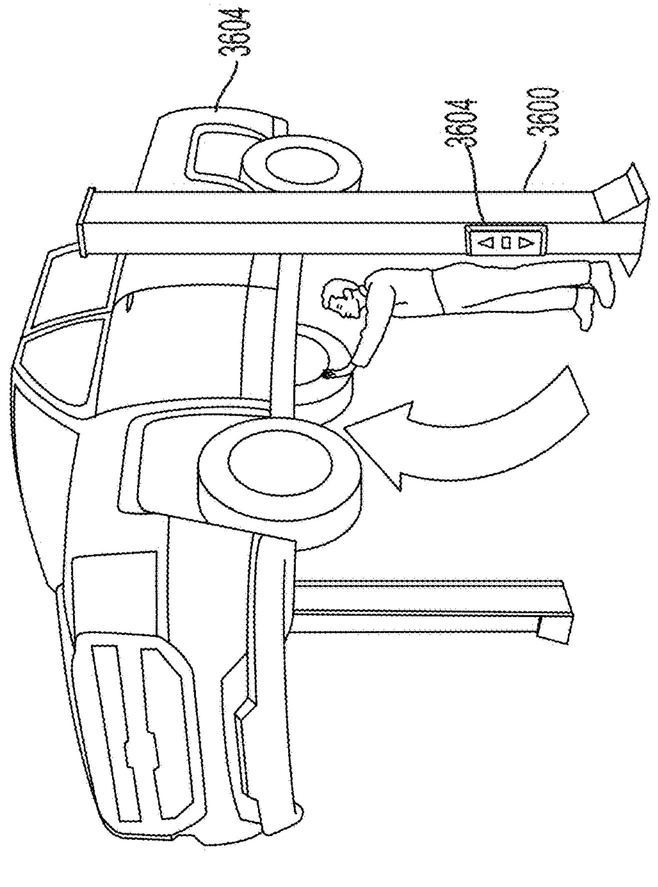

FIGS. 36A and 36B illustrate automotive lift and part replacement implementations of zero-gravity hoist. FIG. 36A illustrates a zero-gravity vehicle lift 3600 that allows a user to raise or lower a vehicle 3602 by pushing or pulling on the vehicle 3602. In some embodiments, separate up/down controls 3604 are also provided for raising and lowering the vehicle. FIG. 36B illustrates an extendable (e.g., telescopic) articulating zero-gravity tripod 3606 for adding/removing a vehicle component (e.g., a windshield) from the vehicle. A user can apply a force to the tripod to cause the articulating arm to raise of lower as needed to replace the vehicle component.

Figure 37A:
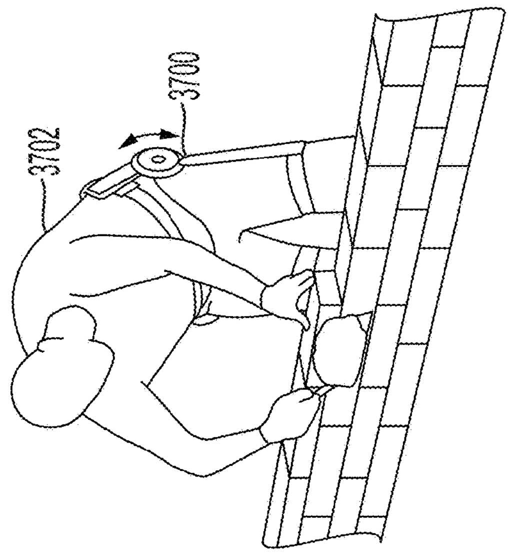
FIGS. 37A, 37B, 37C, and 37D illustrate zero-gravity hoist enabled exoskeletons, according to some embodiments.
Figure 37B:
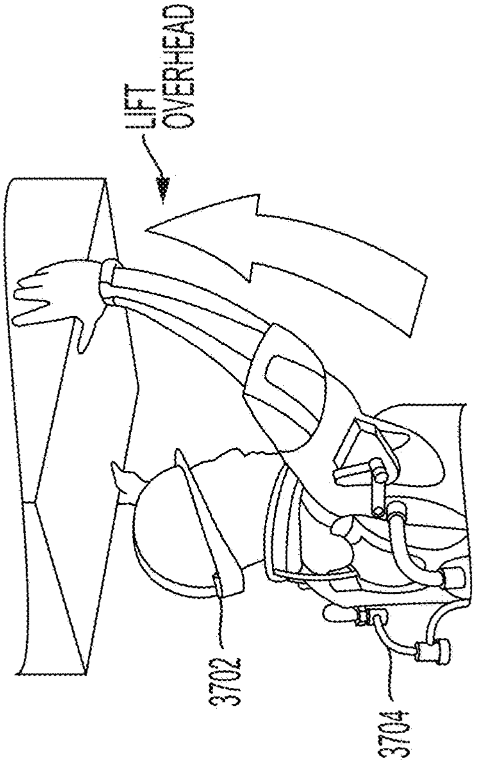
Figure 37C:
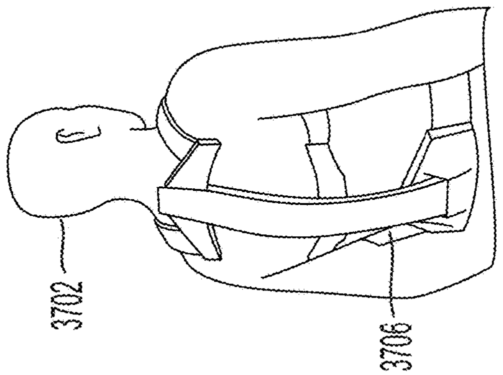
Figure 37D:
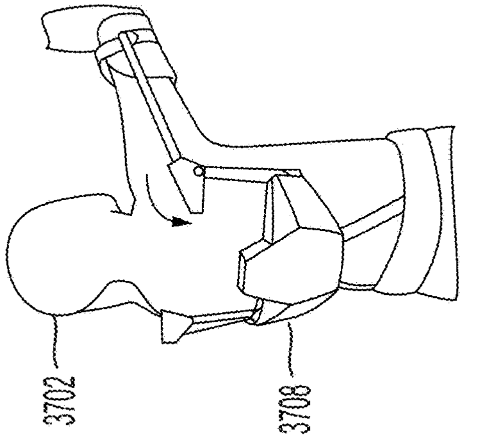

FIGS. 37A, 37B, 37C, and 37D illustrate zero-gravity hoist enabled exoskeletons. FIG. 37A illustrates a lower-body exoskeleton 3700 for assisting movement of a user 3702 between their waist and lower legs. As the user 3702 bends (e.g., bends down, lifts up, etc.), the zero-gravity control of the exoskeleton 3700 assists the user's movement. As a result, the user 3702 is able to be supported by the exoskeleton 3700 when performing some repetitive work (e.g., bending over) and assisted by the exoskeleton 3700 when performing other repetitive work (e.g., lifting). FIG. 37B illustrates an upper-body exoskeleton 3704 for assisting movement of a user's arms. As the user 3702 lifts an object, the zero-gravity control of the exoskeleton 3704 assists the user's movement and effectively makes the object being lifted seem lighter. FIG. 37C illustrates a back exoskeleton 3706 including zero-gravity control. The back exoskeleton 3706 provides additional support to user's back to reduce the effects of repetitive tasks (e.g., lifting). FIG. 37D illustrates an upper body exoskeleton 3708 with zero-gravity control that provides stability and assistance to both the user's back and the user's arms.

Figure 38B:
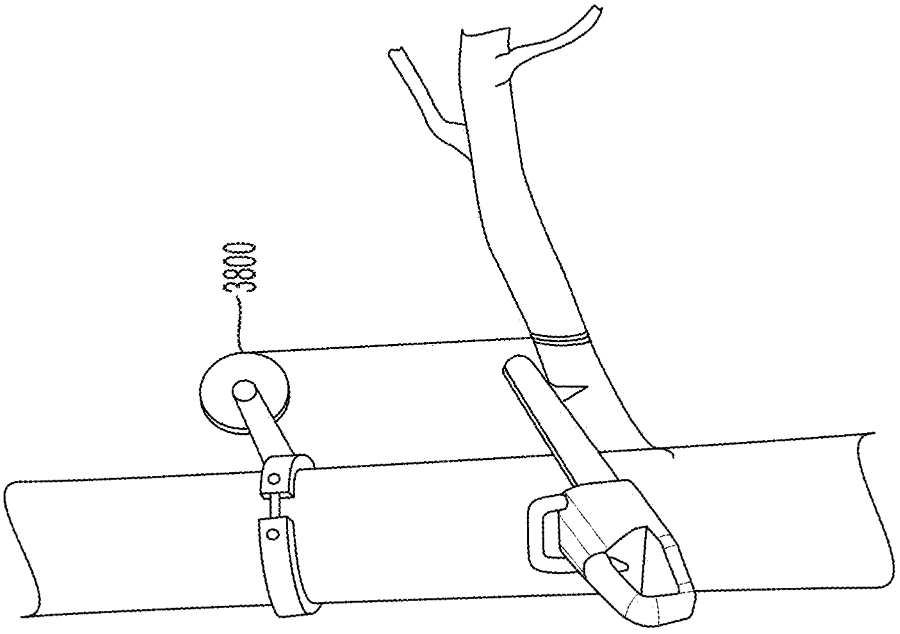
FIGS. 38A and 38B illustrate tree cutting implementations of a zero-gravity hoist system, according to some embodiments.
Figure 38A:
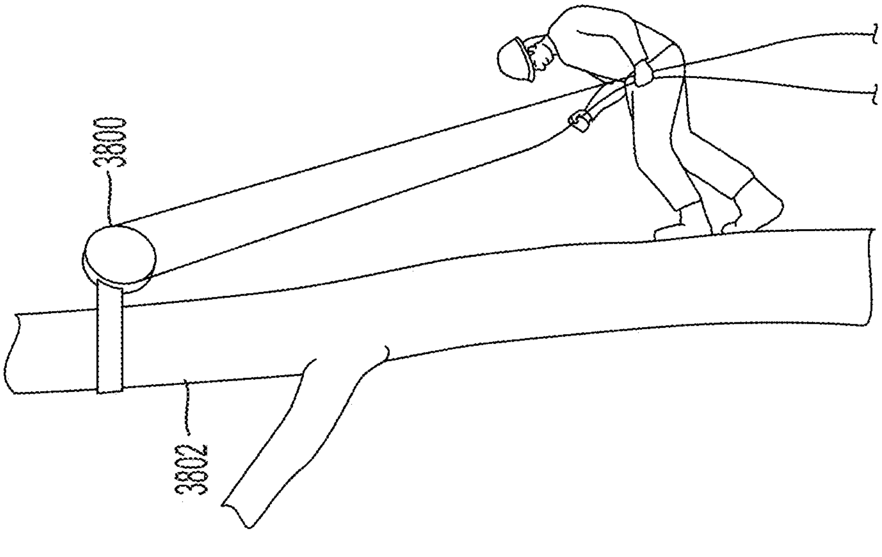

FIGS. 38A and 38B illustrate tree cutting implementations of a zero-gravity hoist system. FIG. 38A illustrates a zero-gravity hoist 3800 attached to a tree 3802. The hoist 3800 assists the user in climbing the tree up or down with minimal effort. FIG. 38B illustrates the zero-gravity hoist system 3804 being used to suspend a tool or support a tree branch (e.g., to prevent or control how it falls).

Thus, embodiments described herein provide, among other things, a zero-gravity hoist system. Various features and advantages are set forth in the following claims.

What is claimed is:

1. A load sensor, comprising:

a load sensing assembly configured to determine a force of a load attached to a device the load sensing assembly positioned between the device and a load, the load sensing assembly including:

a spring plate configured to deflect in a first direction when the force of the load increases, a first sensor configured to apply a first electrical signal to a first conductive surface associated with the spring plate, the first sensor including a first antenna configured to receive a signal from the first conductive surface, wherein the first electrical signal is dependent on a distance between the first antenna and the first conductive surface, and a sensor circuit configured to receive an input from the antenna representative of the distance between the first antenna and the first conductive surface.

2. The load sensor of claim 1, wherein the sensor circuit sensor circuit includes a tank circuit configured to detect a change in inductance in the first electrical signal from the first sensor.

3. The load sensor of claim 2, wherein the change in inductance is proportional to the distance between the first antenna and the first conductive surface.

4. The load sensor of claim 1, wherein the load sensing assembly further includes:

a second sensor configured to apply an electrical signal to a second conductive surface associated with the spring plate, the second sensor including a second antenna configured to receive a signal from the second conductive surface, wherein the second electrical signal is dependent on a distance between the second antenna and the second conductive surface.

5. The load sensor of claim 4, wherein the first sensor and the second sensor are located mechanically opposite of each other.

6. The load sensor of claim 5, wherein the first electrical signal and the second signal are provided to the sensor circuit as differential output signals.

7. The load sensor of claim 1, wherein the device is a hoist device.

8. The load sensor of claim 1, wherein the hoist device comprises:

a chain fall, wherein the chain fall is coupled to the load;

a motor coupled to the chain fall, and configured to drive the chain fall in one or more directions; and a controller in communication with the load sensing assembly and having one or more electronic processors, wherein the one or more electronic processors are configured to:

receive an input from a user indicating that the load coupled to the chain fall is at a desired height;

receive a first force of the load from the load sensing assembly in response to receiving the input;

store the measured force in a memory of the controller;

receive a second force of the load from the load sensing assembly;

determine a difference between the second measured force and the first measured force; and adjust the height of the load based on determining that the second force differs from the first force by a predetermined threshold.

9. A system, comprising:

a hoist;

a motor coupled to the hoist, the motor configured to drive the hoist in one or more directions;

a load sensing assembly configured to determine a force of a load attached to the hoist, the load sensing assembly positioned between the hoist and a support or the load, the load sensing assembly including:

a spring plate configured to deflect in a first direction when the load increases, a first sensor configured to apply a first electrical signal to a first conductive surface associated with the spring plate, the first sensor including a first antenna configured to receive a signal from the first conductive surface, wherein the first electrical signal is dependent on a distance between the first antenna and the first conductive surface, and a sensor circuit configured to receive an input from the first antenna representative of the distance between the first antenna and the first conductive surface; and a controller having one or more electronic processors, wherein the one or more electronic processors are configured to:

adjust a height of the load based on data received from the load sensing assembly.

10. The system of claim 9, wherein the one or more electronic processors are further configured to:

receive a first force of the load from the load sensing assembly in response to receiving an input, store the received first force in a memory of the controller, receive a second force of the load from the load sensing assembly, determine a difference between the second measured force and the first measured force, and adjust a height of the load based on determining that the second force differs from the first force by a predetermined threshold.

11. The system of claim 10, wherein the one or more electronic processors are further configured to lower the height of the load based on determining that the second force is greater than the first force by at least the predetermined threshold.

12. The system of claim 10, wherein the one or more electronic processors are further configured to raise the height of the load based on determining that the second force is less than the first force by at least the predetermined threshold.

13. The system of claim 9, wherein the sensor circuit includes a tank circuit configured to detect a change in inductance in the first electrical signal from the first sensor.

14. The system of claim 13, wherein the change in inductance is proportional to the distance between the first antenna and the first conductive surface.

15. The system of claim 14, wherein the load sensing assembly further includes:

a second sensor configured to apply a second electrical signal to a second conductive surface associated with the spring plate, the second sensor including a second antenna configured to receive a second signal from the second conductive surface, wherein the second electrical signal is dependent on a second distance between the second antenna and the second conductive surface.

16. A hoist system, comprising:

a hoist;

a motor coupled to the hoist, and configured to drive the hoist in one or more directions;

a load sensing assembly configured to determine a force of a load attached to the hoist, wherein the load sensing assembly includes:

a spring plate configured to deflect in response to a variation in the force of the load, wherein the spring plate includes a conductive surface configured to receive a first signal; and an antenna configured to receive a second electrical signal from the first conductive surface; wherein the second electrical signal is associated with a distance between the antenna and the conductive surface, the antenna configured to generate an output based on the received second electrical signal; and a controller having one or more electronic processors, wherein the one or more electronic processors are configured to:

receive a first output from the antenna;

determine a first force of the load in response to receiving the input and based on the received first output;

store the measured force in a memory of the controller;

receive a second output from the antenna;

measure a second force of the load based on the received second output;

determine a difference between the second measured force and the first measured force; and adjust the height of the load in response to the determined difference being within a predefined range of difference values.

17. The hoist system of claim 16, wherein the predefined range is between two pounds and twenty pounds.

18. The hoist system of claim 16, wherein the electronic processors are further configured to determine a weight of the load based on a received input from the load sensing assembly.

19. The hoist system of claim 18, wherein the electronic processors are further configured to control a speed at which the height of the load is adjusted based on the determined weight of the load.

20. The hoist system of claim 19, wherein the speed is reduced upon the determined weight of the load exceeding a predetermined value.

* * * * *